(12) United States Patent
Takamatsu et al.

(10) Patent No.: US 6,233,062 B1
(45) Date of Patent: *May 15, 2001

(54) IMAGE PROCESSING DEVICE AND IMAGE FORMING APPARATUS

(75) Inventors: Masahiro Takamatsu; Koichiro Shinohara; Nobuyuki Kato; Masahiko Kubo; Kazuhiro Iwaoka, all of Nakai-machi (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,848

(22) Filed: Nov. 3, 1997

(30) Foreign Application Priority Data

Nov. 8, 1996 (JP) .................................................... 8-312985

(51) Int. Cl.⁷ ........................................................ H04N 1/40
(52) U.S. Cl. ............................................. 358/463; 358/461
(58) Field of Search ..................................... 358/486, 474, 358/462, 448, 452, 461, 463; 382/296, 297, 274

(56) References Cited

U.S. PATENT DOCUMENTS

| 5,379,127 | * | 1/1995 | Ando ..................................... 358/448 |
| 5,384,645 | * | 1/1995 | Hasegawa et al. ................... 358/444 |
| 5,521,720 | * | 5/1996 | Yoshida ................................ 382/297 |
| 5,619,242 | * | 4/1997 | Haneda et al. ....................... 358/298 |
| 5,740,505 | * | 4/1998 | Kusumoto et al. .................. 399/200 |
| 5,742,410 | * | 4/1998 | Suzuki ................................. 358/448 |
| 5,862,257 | * | 1/1999 | Sekine et al. ........................ 358/462 |
| 5,946,411 | * | 8/1999 | Yamaguchi ........................... 382/162 |

FOREIGN PATENT DOCUMENTS

| 5-281790 | 10/1993 | (JP) . |
| 6-87234  | 3/1994  | (JP) . |
| 8-228298 | 9/1996  | (JP) . |
| 8-337007 | 12/1996 | (JP) . |
| 8-339441 | 12/1996 | (JP) . |

* cited by examiner

Primary Examiner—Jerome Grant, II
(74) Attorney, Agent, or Firm—Oliff & Berridge, PLC

(57) ABSTRACT

It is made possible to prevent decrease in the density due to the image output characteristic of the image output unit in the subscanning direction by means of a method according to the present invention capable of real-time processing without causing the circuit capacity and the memory to be increased. In an image input unit 100, the input image data is acquired so that its time series direction becomes a direction indicated by an arrow 42 corresponding to the subscanning direction of an image output unit 300. The input image data from the image input unit 100 is corrected in accordance with the image output characteristic of the image output unit 300 in the subscanning direction. The image data after the correction is rotationally processed so that its time series direction becomes a direction indicated by an arrow 41 corresponding to the main scanning direction of the image output unit 300. The image data after the rotary processing is sent to the image output unit 300.

18 Claims, 22 Drawing Sheets

IMAGE PROCESSING DEVICE AND IMAGE FORMING APPARATUS

BACKGROUND OF THE INVENTION

The present invention relates to an image processing device used for a digital copying machine, a computer printer or a network printer and the like, and an image forming apparatus having the image processing device as an image input unit and an image processing unit.

In a large number of image forming apparatuses currently commercialized such as digital copying machines, computer printers or network printers, the electrophotography method capable of obtaining an output image of high quality at high speed as the image output unit (image output device) has widely been employed.

In the electrophotography method, as development means, there is widely used the two-component magnetic brush development in which insulating toner is charged by mixing the insulating toner with magnetic particles and causing friction in a developer unit, developer is formed in a brush shape on a development roll by means of magnetic force, and the developer is supplied on a photosensitive member by the rotation of the development roll to thereby develop an electrostatic latent image on the photosensitive member. This two-component magnetic brush development is more widely used especially for color image forming apparatuses.

However, in the image output unit of this electrophotographic type, especially in the image output unit using the two-component magnetic brush development, when two image portions having different density in the subscanning direction are continuous, there arises a phenomenon in which the density of their one image portion at the boundary portion between it and the other image portion lowers because of the non-linear and asymmetric image output characteristics in the subscanning direction.

This phenomenon has two types, one of which is that when an image outputted changes from a half tone portion 1 to a background portion 2 in a subscanning direction orthogonal to a main scanning direction which is a scanning direction of a light beam for forming an electrostatic latent image on the photosensitive member as shown in FIG. 17(A), the density at the rear end portion 1B of the half tone portion 1 in contact with the background portion 2 lowers. Hereinafter, this is referred to as decrease in the density at the half tone portion.

The other is that when an image outputted changes from a low density portion 12L to a high density portion 13H in the subscanning direction, the density at the rear end portion 12W of the low density portion 12L in contact with the high density portion 13H lowers as shown in FIG. 17(B). Hereinafter, this is referred to as decrease in the density at the low density portion.

According to the electrophotography method using the two-component magnetic brush development, as shown in FIG. 18, a photosensitive drum 310 is charged by an electrostatic latent image forming charger 320 by the rotation of the photosensitive drum 310 in a direction indicated by an arrow 311, and laser light L modulated through an image signal is irradiated onto the photosensitive drum 310 thus charged to thereby form an electrostatic latent image on the photosensitive drum 310. The photosensitive drum 310, on which the electrostatic latent image has been formed, comes into contact with a developer layer 337 on the surface of a development sleeve 335 which rotates at linear speed approximately twice the linear speed of the photosensitive drum 310 in a direction indicated by an arrow 336, whereby the toner within the developer layer 337 adheres to a latent image portion on the photosensitive drum 310 so that the electrostatic latent image on the photosensitive drum 310 is developed into a toner image.

FIG. 18(A) shows a state in the moment a latent image portion 3 of the half tone portion 1 is formed on the photosensitive drum 310 by the irradiation of the laser light L so that its front edge 3f comes into contact with the developer layer 337, FIG. 18(B) shows a state in the moment a portion somewhat on this side of the rear edge 3b of the latent image portion 3 comes into contact with the developer layer 337, and FIG. 18(C) shows a state in the moment the rear edge 3b of the latent image portion 3 comes into contact with the developer layer 337.

The developing bias at a potential of, for example, −500 V is applied to the development sleeve 335. The photosensitive drum 310 is charged at a potential of, for example, −650 V, having a higher absolute value than the developing bias potential by the charger 320, and the latent image portion 3 of the half tone portion 1 is charged at a potential of, for example, −200 V, a lower absolute value than the developing bias potential. Also, a portion 4 corresponding to the background portion 2 behind the half tone portion 1 is charged at a potential of −650 V having a higher absolute value than the developing bias potential.

When the front edge 3f of the latent image portion 3 comes into contact with the developer layer 337 as shown in FIG. 18(A), a forward development field is applied to toner tq which exists at a position Q where the photosensitive drum 310 comes into contact with the developer layer 337 so that the toner tq is brought close to the surface of the developer layer 337 to adhere to the latent image portion 3. When, however, a portion 4 corresponding to the background portion 2 behind the half tone portion 1 is brought close to the developer layer 337 as shown in FIG. 18(B), toner tb which exists in a portion of the developer layer 337 facing to the portion 4 is spaced apart from the surface of the developer layer 337 by the development field in the reverse direction to get into the depths of the developer layer 337.

By the rotation of the development sleeve 335 in the direction indicated by the arrow 336, its toner tb is brought closer to the position Q, where the photosensitive drum 310 comes into contact with the developer layer 337, and at the same time, moves to the surface side thereof because of the low potential at the latent image portion 3, but some delay occurs to reach the surface of the developer layer 337. For this reason, when the portion somewhat on this side of the rear edge 3b of the latent image portion 3 comes into contact with the developer layer 337 as shown in FIG. 18(B), the amount of toner adhering to the photosensitive drum 310 starts to decrease so that the density at the rear end portion 1B of the half tone portion 1 in contact with the background portion 2 lowers as shown in FIG. 17(A).

If the front of the half tone portion 1 is also the background portion, also when the front edge 3f of the latent image portion 3 comes into contact with the developer layer 337 as shown in FIG. 18(A), there arises, in the toner in the developer layer 337, toner which is kept away from the surface of the developer layer 337 by a portion 5 on the photosensitive drum 310 corresponding to the background portion ahead as shown by toner tf.

By the rotation of the development sleeve 335 in the direction indicated by the arrow 336, however, the toner tf is rapidly kept away from the position Q, where the photosensitive drum 310 comes into contact with the developer layer 337, and at the same time, the toner tq brought close to the surface of the developer layer 337 because of the low potential at the latent image portion 3 approaches the position Q immediately to adhere to the latent image portion 3. Therefore, even if the image outputted changes from the background portion to the half tone portion 1 on the contrary in the subscanning direction, the density at the front end portion of the half tone portion 1 in contact with the background portion does not lower.

Also, as regards decrease in the density at low density portion, FIG. 19(A) shows a state in the moment a latent image portion 32L of the low density portion 12L is formed on the photosensitive drum 310 by the irradiation of laser light L so that its front edge 32f comes into contact with the developer layer 337, FIG. 19(B) shows a state in the moment the rear edge 32b of the latent image portion 32L comes into contact with the developer layer 337, and FIG. 19(C) shows a state in the moment the latent image portion 33H of the high density portion 13H somewhat in the rear of the rear edge 32b of the latent image portion 32L comes into contact with the developer layer 337.

The latent image portion 32L of the low density portion 12L is charged at, for example, −300 V having a lower absolute value than the developing bias potential. Also, the latent image portion 33H of the high density portion 13H behind the low density portion 12L is charged at, for example, −200 V having a lower absolute value than the potential at the latent image portion 32L of the low density portion 12L.

When the front edge 32f of the latent image portion 32L comes into contact with the developer layer 337 as shown in FIG. 19(A), a forward development field is applied to toner ta existing in the position Q, where the photosensitive drum 310 comes into contact with the developer layer 337 to cause the toner ta to adhere onto the latent image portion 32L. Thereafter, until the rear edge 32b of the latent image portion 32L comes into contact with the developer layer 337 as shown in FIG. 19(B), the toner adheres to the latent image portion 32L of the low density portion 12L. The toner tc is toner adhering to the rear end portion of the latent image portion 32L in contact with the latent image portion 33H corresponding to the rear end portion of the low density portion 12L in contact with the high density portion 13H.

After the point of time shown in FIG. 19(B), however, the latent image portion 33H of the high density portion 13H will come into contact with the developer layer 337. The potential at the latent image portion 33H has a lower absolute value than the potential at the latent image portion 32L, and a forward, greater development field is applied between the latent image portion 33H and the developer layer 337, and therefore, a large quantity of toner adhere to the latent image portion 33H.

Therefore, in the vicinity of the position Q, in the developer layer 337, where the photosensitive drum 310 comes into contact with the developer layer 337, the magnetic particles which have been covered with the toner are exposed, and the potential of the magnetic particles causes the toner tc which once adhered to the rear end portion of the latent image portion 32L in contact with the latent image portion 33H as shown in FIG. 19(B) to be pulled back into the developer layer 337.

Therefore, as shown as a portion where no toner exists in FIG. 19(C) (all toner does not always disappear, but this figure shows a simplified one), the amount of toner at the rear end portion of the latent image portion 32L in contact with the latent image portion 33H decreases, and the density at the rear end portion 12W of the low density portion 12L in contact with the high density portion 13H lowers as shown in FIG. 17(B). In this respect, the amount of toner te adhering to the latent image portion 33H of the high density portion 13H becomes larger than that of the toner ta adhering to the latent image portion 32L of the low density portion 12L, but FIG. 19(C) shows as the same quantity for convenience sake.

Decrease in the density at the rear end portion 12W of the low density portion 12L, that is, reduction of the amount of toner at the rear end portion of the latent image portion 32L is caused by the toner tc adhering to the rear end portion of the latent image portion 32L being pulled back into the developer layer 337 by a potential having a low absolute value, at the latent image portion 33H of the high density portion 13H immediately subsequent to the low density portion 12L, and therefore, the density at the front end portion of the low density portion in contact with the high density portion does not lower even if the image outputted changes from the high density portion to the low density portion on the contrary in the subscanning direction.

Thus, in the electrophotography method using the two-component magnetic brush development, when an image outputted changes from the half tone portion to the background portion in the subscanning direction, the density at the rear end portion of the half tone portion in contact with the background portion lowers, and when an image outputted changes from the low density portion to the high density portion in the subscanning direction, the density at the rear end portion of the low density portion in contact with the high density portion lowers, In Japanese Published Unexamined Patent Application Nos. 5-281790 and 6-87234, there is shown an idea that the accuracy of a laser light scanner for writing an electrostatic latent image on a photosensitive member through laser light is improved, and the parameter of development means for developing the electrostatic latent image is adjusted to thereby enhance the contrast of the development field for preventing decrease in the density at the half tone portion and decrease in the density at the low density portion described above.

However, the method of enhancing the contrast of the development field by improving the accuracy of the laser light scanner, which is the means for writing an electrostatic latent image, leads to a large size and a high cost of the image output unit. And yet, if the number of screen lines is increased at the image output unit to improve the resolution of the output image, the contrast of the development field lowers to more easily cause decrease in the density at the half tone portion and decrease in the density at the low density portion. Therefore, it is difficult to avoid a large size and a high cost of the image output unit while achieving higher resolution of the output image by an increase in the number of screen lines.

In recent years, with the spread of computer printers and network printers, an opportunity of printing a graphic image formed on a host computer such as a personal computer tends to increase. In such a graphic image, decrease in the density at the half tone portion and decrease in the density at the low density portion more easily attract people's attention than a natural image such as photographs. Therefore, in an image forming apparatus such as computer printers and network printers, decrease in the density at the half tone portion and decrease in the density at the low density portion pose a more serious problem than in an image forming apparatus such as copying machines.

As a method for correcting such output characteristic of an image forming apparatus in a linear and symmetrical area having high spatial frequency as MTF characteristic, a method for correcting input image data using a digital filter process has widely been employed.

However, the aforesaid lowered density at the half tone-portion and lowered density at the low density portion occur non-linearly and asymmetrically only in the image portion in front of the image edge in the subscanning direction, and the area extends over a range of 1 to 2 mm, although it depends upon the pixel value of the half tone portion in front of the image edge or the difference in pixel value between low density portion and high density portion before and behind the image edge. Also, in order to, determine whether or not decrease in the density occurs, and the characteristic properties such as range and amount of decrease in the density if it occurs, the image data after the edge must be also observed over the same extent of range.

To that end, if an attempt is made to reduce or prevent decrease in the density by the digital filter process, the process extends over such a wide range as 4 mm in the subscanning direction, for example, 64 pixels continuous in the subscanning direction in an image forming apparatus having resolution of 16 dpm (dot/mm), 400 dpi (dot/inch) or 96 pixels continuous in the subscanning direction in an image forming apparatus having resolution of 24 dpm, 600 dpi. In addition, since decrease in the density is non-linear and asymmetric, and moreover occurs in an area with low spatial frequency, it is impossible to reduce or prevent decrease in the density by the digital filter process.

As a method for preventing decrease in the density at the half tone portion and decrease in the density at the low density portion, the inventors considered a method to avoid a large size and a high cost of the image output unit while achieving higher resolution of the output image by an increase in the number of screen lines.

This is to detect a half tone portion or a low density portion, in which decrease in the density occurs, from the input image data to thereby correct the pixel value at the half tone portion or the low density portion of the input image data so as to supplement the amount of lowered density. In this case, the characteristic properties such as the range and amount of decrease in the density occurring in the image output unit are elucidated or measured in advance to obtain correction characteristic corresponding to the density decrease characteristic. Thus, the correction characteristic is described in the image processing device to be furnished for correction of the input image data during image processing.

As a concrete method, it is conceivable to write the image data in a page memory after correcting it. More specifically, in the case of a digital copying machine, as shown in FIG. 20(A), image data Ri, Gi and Bi of red, green and blue from the image input unit 100 are supplied to a color conversion gradation correction unit 201 in the image processing unit 200, and image data Yi, Mi, Ci and Ki of yellow, magenta, cyan and black can be obtained from the color conversion gradation correction unit 201.

Thus, the image data Yi, Mi, Ci and Ki from the color conversion gradation correction unit 201 are supplied to an image correction unit 202, in which the pixel values for the image data Yi, Mi, Ci and Ki are corrected, and the image data after the correction are written in the page memory 203. Then, after the image data for one page are written, the image data Yo, Mo, Co and Ko of yellow, magenta, cyan and black are read as the output image data from the page memory 203 to be fed to an image output unit 300.

In this case, in a copying machine extending over the aforesaid range of about 4 mm in the subscanning direction, that is, having resolution of 16 dpm, 400 dpi as shown in FIG. 20(B), the image correction unit 202 processes image data in the main scanning line Lm extending over about 64 lines continuous in the subscanning direction simultaneously to detect the half tone portion 1 and the background portion 2 or the low density portion 12L and the high density portion 13H from an area 20 before and behind the image edge Eg, to detect the characteristic properties of decrease in the density at the half tone portion 1 or the low density portion 12L, and to correct the pixel value retroactively to the image data before the image edge Eg referring to the correction characteristic described in the image correction unit 202.

In the case of writing the image data in the page memory 203 after correcting them by the image correction unit 202 in this way, however, it is necessary to store as an enormous amount of pixel data as hundreds of thousands extending over several thousands of pixels in the main scanning direction and extending over such many main scanning lines Lm as 64 lines in the subscanning direction in a correction memory separate from the page memory 203 for two dimensional image processing, thus leading to an immense circuit capacity of the image correction unit 202 and a higher cost of the image processing unit 200.

Thus, as another method, it is conceivable to correct the image data after writing them in the page memory. More specifically, in the case of a digital copying machine, as shown in FIG. 21(A), the image data Yi, Mi, Ci and Ki from the color conversion gradation correction unit 201 for each page are written in the page memory 203, and thereafter, the image data written in the page memory 203 are corrected by the image correction unit 202. After the correction, the image data Yo, Mo, Co and Ko are read out as output image data from the page memory 203 to be fed to the image output unit 300.

In this case, the image correction unit 202 simultaneously processes the image data of, for example, 64 pixels continuous, on one of lines Ls in the subscanning direction as shown in FIG. 21(B) to detect the half tone portion 1 and the background portion 2 or the low density portion 12L and the high density portion 13H from the area 20 before and behind the image edge Eg, to detect the characteristic properties of decrease in the density at the half tone portion 1 or the low density portion 12L, and to correct the pixel value retroactively to the image data before the image edge Eg referring to the correction characteristic described in the image correction unit 202. This operation is repeated for each line Ls in the subscanning direction.

Therefore, in this case, the processing scale becomes noticeably smaller than in the case of writing the image data in the page memory 203 after correcting them by the image correction unit 202 as shown in FIG. 20. In this case, however, there is inconvenience that data cannot be corrected on a real-time basis because the image data are corrected after image data for one page are written in the page memory 203.

In the case of a network printer, it is also conceivable to correct the image data after they are written in the page memory as described below. More specifically, in the case of the network printer, there is taken in an image processing unit 700 print information described in page description language (hereinafter, referred to as PDL) transmitted from a client apparatus consisting of a computer, a work station and the like, which are omitted in the figure, to the network 400 by a communication control unit 710 in the image processing unit 700 as shown in FIG. 22.

In the image processing unit 700, a communication protocol analytical control unit 721 analyzes the protocol of the input information, a PDL command/data analysis unit 722 analyzes the print information described in PDL, that is, PDL command/data, and the image development unit 770 develops the image data as a data row in the main scanning direction. If code data from the PDL command/data analysis unit 722 contain character information, the image data concerning characters are developed by the outline information from a character development unit 724.

Also, a color determination unit 725 produces a parameter for converting the image data developed in the image development unit 770 into image data for each color of YMCK on the basis of color information of the PDL command/data. The parameter causes an information association unit 726 to convert the image data developed by the image development unit 770 into image data each color of YMCK.

The image data for each color of YMCK from this information association unit 726 are written by an amount corresponding to one page in the page memory 760, and thereafter, the image data written in the page memory 760 are corrected by a correction painting unit 780. After the correction, the image data for each color of YMCK are read out as the output image data from the page memory 760 to be sent to the image output unit 800. The image data are corrected at the correction painting unit 780 by reading the image data in the subscanning direction from the page memory 760 in the same manner as in the image correction unit 202 in the case of the digital copying machine shown in FIG. 21.

In this case, however, there is inconvenience that data cannot be corrected on a real-time basis because the image data are corrected after the image data for one page are written in the page memory 760 in the same manner as in the case of the digital copying machine shown in FIG. 21.

Also, in the case of a network printer, compressed image data referred to as intermediate code are generally written in the page memory 760 from the image development unit 770 through the information association unit 726. When, however, the compressed image data are thus written in the page memory 760, all compressed image data in the main scanning line must be analyzed to read the image data in the subscanning direction from the page memory 760 for correction in the correction painting unit 780, thus resulting in a complicated process. To that end, when an attempt is made to write image data in an uncompressed form in the page memory 760, there arises inconvenience that a large capacity of page memory 760 will be required.

From the foregoing, the present invention prevents decrease in the density due to the image output characteristic of the image output unit in the subscanning direction by means of a method to avoid a large size and a high cost of the image output unit while achieving higher resolution of the output image by an increase in the number of screen lines, and real-time processing without causing the circuit capacity and the memory to be increased.

SUMMARY OF THE INVENTION

According to the present invention, an image processing device for processing image data to send it to an image output device for outputting the image onto a recording medium through the image data, comprises:

image input means for acquiring input image data so that its time series direction becomes a direction corresponding to a subscanning direction orthogonal to a main scanning direction, which is a direction in which pixels are temporally continuously formed on the recording medium of the image output device;

image correction means for correcting the input image data from the image input means in accordance with the image output characteristic of the image output device in the subscanning direction; and rotary processing means for rotationally processing the image data from the image correction means after the correction so that its time series direction becomes a direction corresponding to the main scanning direction of the image output device, and for sending the image data after the rotary processing to the image output device.

Also, according to the present invention, an image forming apparatus is provided with:

image output means for outputting an image on a recording medium through image data;

image input means for acquiring input image data so that its time series direction becomes a direction corresponding to the subscanning direction orthogonal to the main scanning direction, which is a direction in which pixels are temporally continuously formed on the recording medium of the image output means;

image correction means for correcting the input image data from the image input means in accordance with the image output characteristic of the image output means in the subscanning direction; and rotary processing means for rotationally processing image data from the image correction means after the correction so that its time series direction becomes a direction corresponding to the main scanning direction of the image output means, and for sending the image data after the rotary processing to the image output means.

In the aforesaid image processing device or image forming apparatus, with the image input means as a scanner, the main scanning direction, which is a read line direction of the scanner, can be set to a direction corresponding to the subscanning direction of the image output device or the image output means.

Also, in the image processing device or image forming apparatus, the image input means is provided with image acquisition means for acquiring image information described in the page description language through the communication means, analysis means for analyzing the image information, and image development means for developing the image data according to the analysis result, and by a command to collectively rotate the images being given to the image information, it can be made possible to output, from the image development means, the input image data whose time series direction is set to a direction corresponding to the subscanning direction of the image output device or the image output means.

In an image processing device, constructed as described above, according to the present invention, the input image data, whose time series direction is set to a direction corresponding to the subscanning direction of the image output device, can be obtained from the image input means, and the input image data are corrected at the image correction means in accordance with the image output characteristic of the image output device in the subscanning direction.

In the image correction means, therefore, in order to correct the image data so as to supplement the amount of lowered density due to the image output characteristic of the image output device in the subscanning direction, it is not necessary to store, in a correction memory, image data of as an enormous quantity of pixels as hundreds of thousands, extending over several thousands of pixels in the main scanning direction of the image output device and extending over several tens of lines in the subscanning direction for two-dimensional image processing, unlike a case where the input image data, whose time series direction becomes a direction corresponding to the main scanning direction of the image output device, can be obtained from the image input means. It is possible to correct the image data at high speed with a small scale circuit and yet by real-time processing by one-dimensional image processing which processes image data of several tens of pixels continuous in the subscanning direction in the image output device at the same time.

After the input image data are thus corrected by the image correction means, the image data after the correction are rotationally processed by the image rotation means so that the time series direction of the image data after the correction becomes a direction corresponding to the main scanning direction of the image output device, whereby there can be sent to the image output device such output image data whose time series direction becomes a direction corresponding to the main scanning direction of the image output device as to prevent decrease in the density of the half tone portion and decrease in the density of the low density portion due to the image output characteristic of the image output device in the subscanning direction.

Also, since the pixel value for the input image data is corrected so as to supplement the amount of lowered density, it becomes possible to avoid a large size and a high cost of an image output device while achieving higher resolution of the output image by an increase in the number of screen lines as in a case where the degree of accuracy of a laser light scanner, which is means of writing an electrostatic latent image, is increased to thereby enhance the contrast of the development field for preventing decrease in the density.

The foregoing applies to an image forming apparatus, constructed as described above, according to the present invention.

DETAILED DESCRIPTION OF PREFERRED EMBODIMENTS

<First Embodiment . . . FIG. 1 to FIG. 12>

Figure 1:
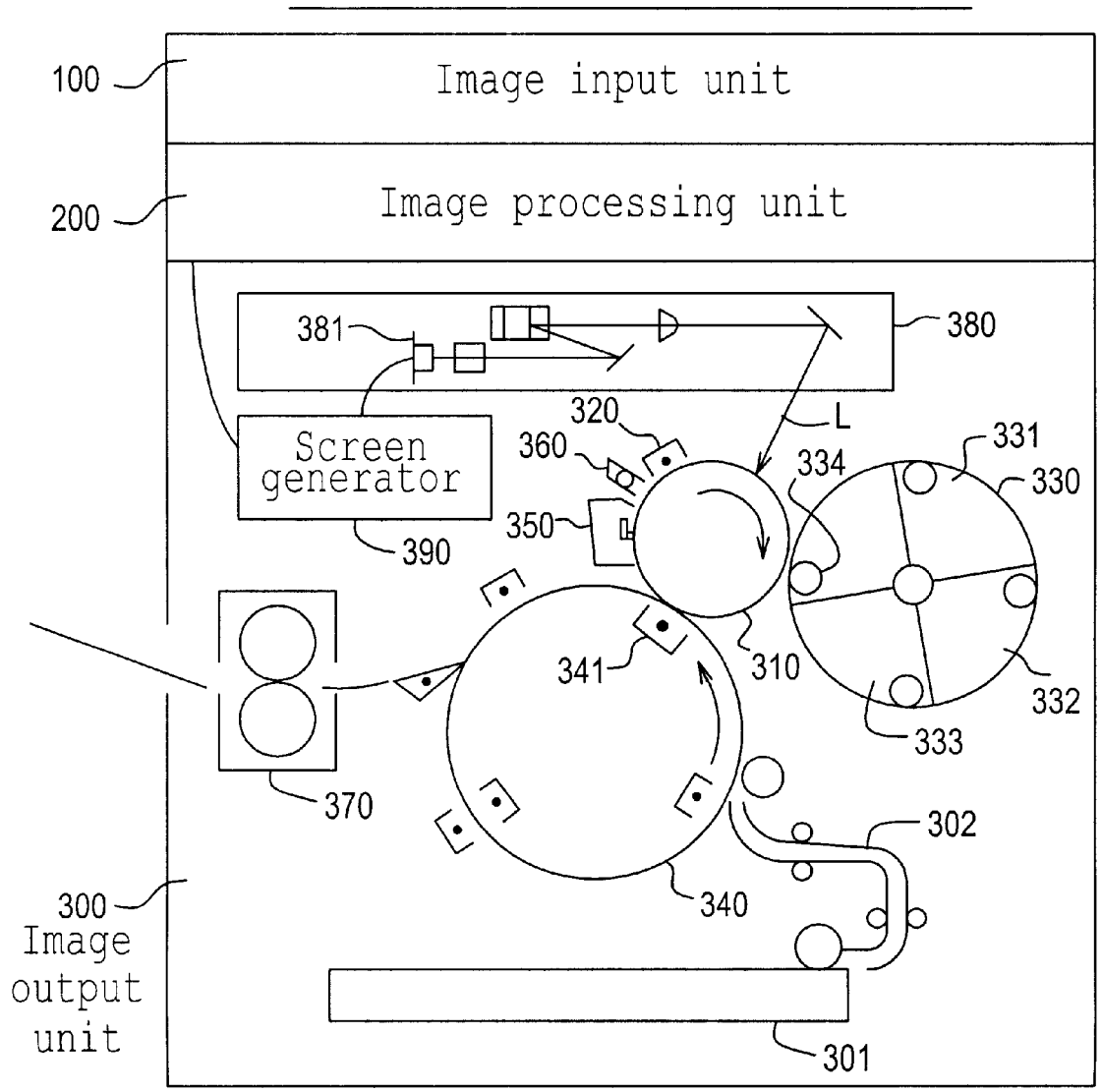
FIG. 1 is a view showing the general construction of a digital color copying machine as an example of an image forming apparatus according to the present invention.

FIG. 1 shows the general construction of a digital color copying machine as an example of an image forming apparatus according to the present invention mounted with an example of an image processing device according to the present invention. The image forming apparatus of this example, that is, a copying machine is provided with an image input unit 100, an image processing unit 200 and an image output unit 300.

In the image input unit 100, the image on an original is read at resolution of, for example, 16 dpm (400 dpi) by a scanner consisting of a CCD sensor and the like to obtain input image data composed of digital data of 8 bit, 256 gradation for each color of RGB (red, green and blue) . However, in the image input unit 100, the main scanning direction, that is, the time series direction of the input image data is set to a direction corresponding to the subscanning direction of the image output unit 300 as described later.

The image processing unit 200 constitutes an example of an image processing device according to the present invention together with the image input unit 100.

In this image processing unit 200, as described later, image data composed of digital data of 8 bit, 256 gradation for each color of YMCK (yellow, magenta, cyan and black), which are recording colors at the image output unit 300, are formed from the input image data from the image input unit 100, the pixel value of the image data is corrected so as to supplement the amount of lowered density due to the image output characteristic of the image output unit 300 in the subscanning direction, and the image data after the correction are rotationally processed so that the time series direction of the image data after the correction becomes a direction corresponding to the main scanning direction of the image output unit 300.

The image output unit 300 uses the two-component magnetic brush development of the electrophotographic type in the image output unit 300, the output image data, from the image processing unit 200, whose time series direction is set to a direction corresponding to the main scanning direction of the image output unit 300 as described above, is converted into a binary signal whose pulse width has been modulated in accordance with the pixel value, that is, a screen signal by a screen generator 390, a laser diode 381 of the laser light scanner 380 is driven through the screen signal to obtain laser light L from the laser diode 381, that is, the laser light scanner 380, and the laser light L is irradiated onto a photosensitive drum 310.

The photosensitive member 310 is charged by a charger 320 for forming an electrostatic latent image, and is irradiated with laser light L from the laser light scanner 380 to thereby form an electrostatic latent image on the photosensitive drum 310.

Developer units 331, 332, 333 and 334 for four colors of KYMC of a rotary developer unit 330 abut upon the photosensitive drum 310 on which the electrostatic latent image has been formed, whereby the electrostatic latent images of each color formed on the photosensitive drum 310 are developed into toner images.

A sheet on a sheet tray 301 is fed onto a transfer drum 340 by a sheet feeding unit 302 to be wound round the transfer drum, and corona discharge is given to the sheet from the back thereof by a transfer charger 341 to thereby transfer a toner image developed on the photosensitive drum 310 onto the sheet. If the output image is a multi-color image, the sheet is caused to repeatedly abut upon the photosensitive drum 310 two to four times to thereby multiple-transfer a plurality of colors of images of four colors of KYMC.

The sheet after the transfer is fed to a fixer 370 to fix the toner image onto the sheet by being heated and melted. The photosensitive drum 310 is cleaned by a cleaner 350 after the toner image is transferred onto the sheet, and is prepared to be ready for re-use by a pre-exposure unit 360.

To be concrete, in this example, as the laser light scanner 380, one having a beam diameter of the laser light L in the main scanning direction and a beam diameter thereof in the subscanning direction being 64 $\mu$m respectively was used. Also, as the developer, one obtained by mixing insulating toner with mean particle diameter of 7 $\mu$m with magnetic particles (ferrite carrier) with mean particle diameter of 50$\mu$m was used, and the toner density was set to 7%.

Figure 2A:
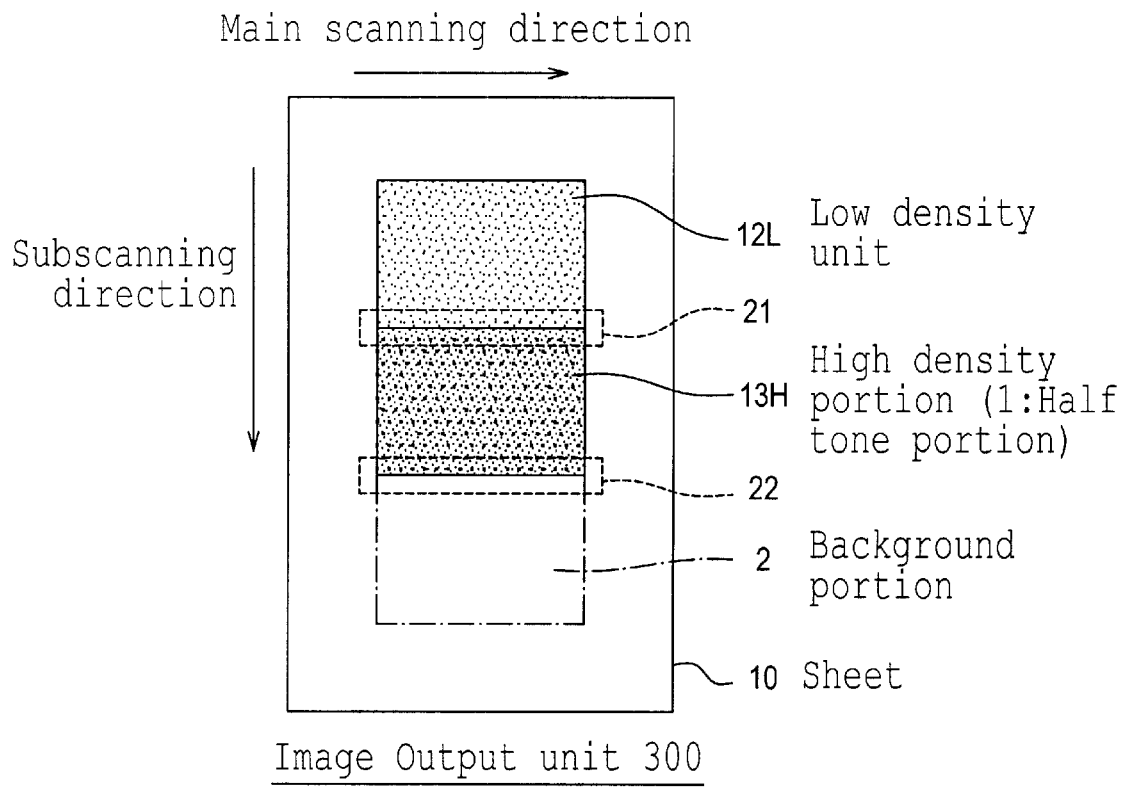
FIGS. 2(A) and 2(B) is an explanatory view illustrating input image data obtained from the image input unit of the copying machine of FIG. 1.
Figure 2B:
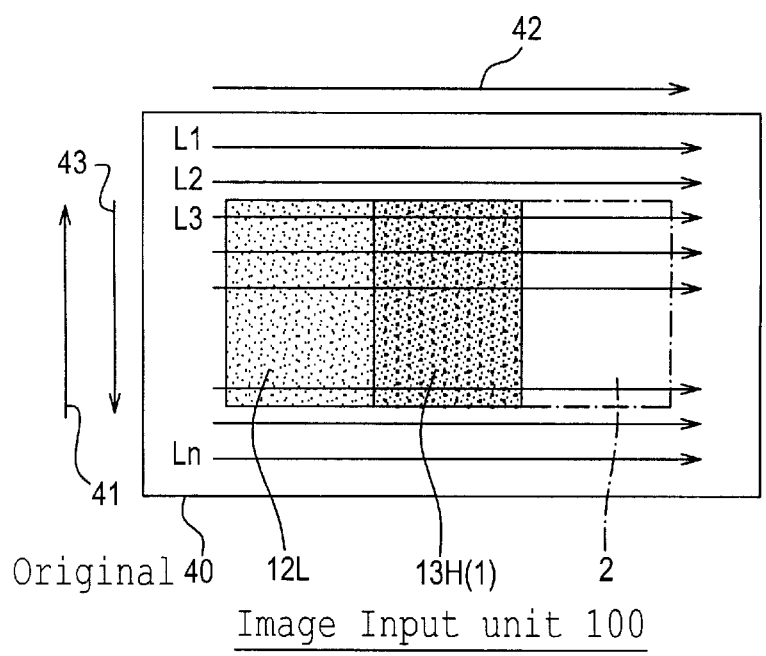

As described above, in the image input unit 100, the main scanning direction, that is, the time series direction of the input image data is set to a direction corresponding to the subscanning direction of the image output unit 300. In other words, in the image input unit 100, a direction indicated by an arrow 41 shown in FIG. 2(B), which corresponds to the main scanning direction (scanning direction of laser light L in FIG. 1) of the image output unit 300 shown in FIG. 2(A), is generally set to the main scanning direction, and a direction indicated by an arrow 42 shown in FIG. 2(B), which corresponds to the subscanning direction of the image output unit 300 shown in FIG. 2(A), is set to the subscanning direction.

In contrast, in the present invention, in the image input unit 100, a direction indicated by an arrow 42, which corresponds to the subscanning direction of the image output unit 300, is set to the main scanning direction, and a direction indicated by an arrow 43 in the reverse direction to the arrow 41 is set to the subscanning direction. In other words, it is arranged such that the input image data can be obtained with lines L1, L2, . . . Ln in FIG. 2(B) as the main scanning lines from the image input unit 100.

Figure 3:
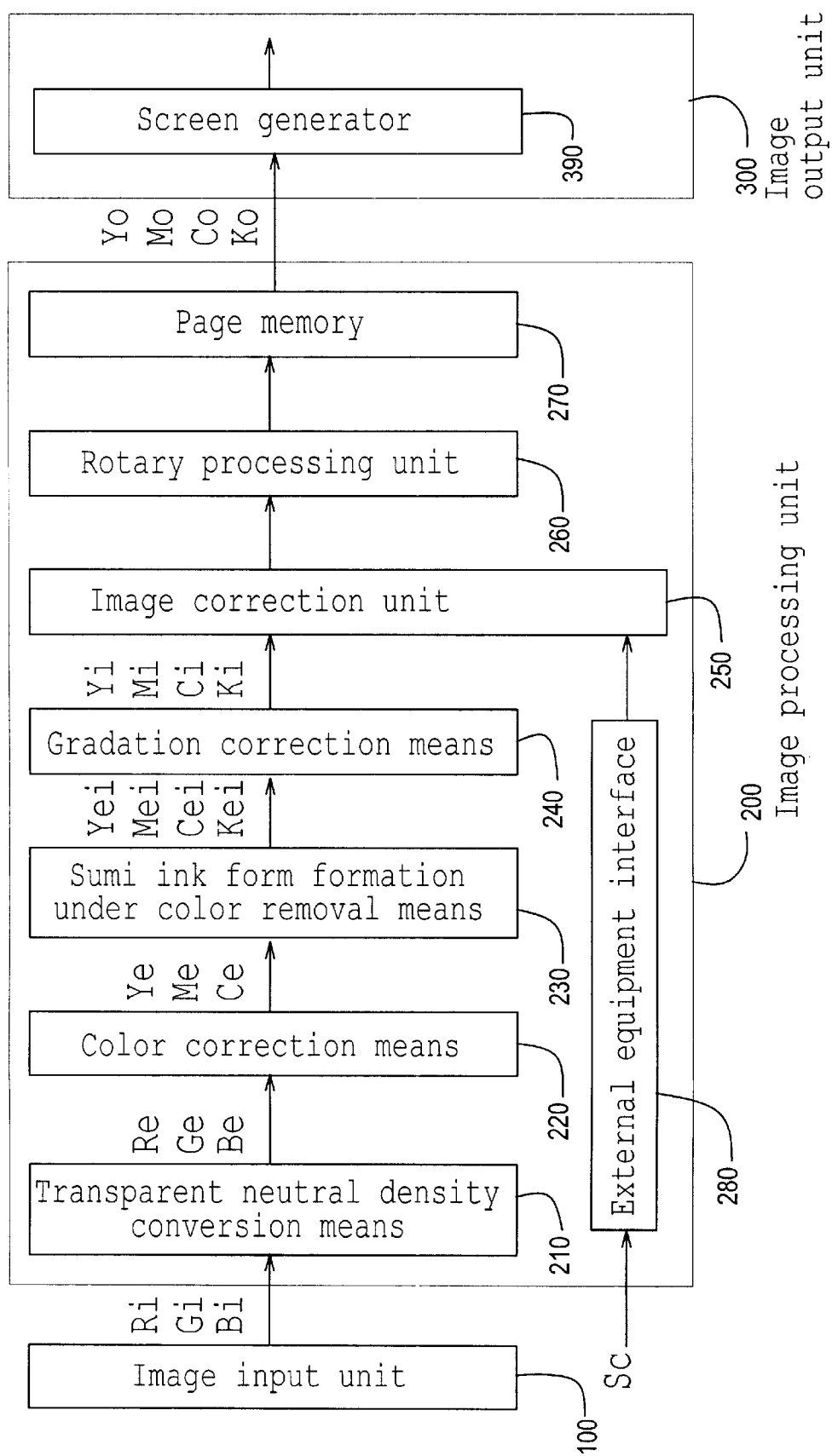
FIG. 3 is a view showing an example of an image processing unit of the copying machine of FIG. 1.

FIG. 3 shows an example of the image processing unit 200, and data Ri, Gi and Bi of three colors of RGB, from the image input unit 100, whose time series directions are set to a direction corresponding to the subscanning direction of the image output unit 300 as described above, are converted into signals Re, Ge and Be of transparent neutral density by transparent neutral density conversion means 210, the signals Re, Ge and Be of transparent neutral density are converted into signals Ye, Me and Ce of three colors of YMC of transparent neutral density by color correction means 220, the signals Ye, Me and Ce of transparent neutral density are converted into signals Yei, Mei and Cei of three colors of YMC, which have been under color removed, and a sumi signal Kei by black printer form formation under color removal means 230, and the signals Yei, Mei, Cei and Kei are gradation corrected by gradation correction means 240 to be converted into image signals consisting of data Yi, Mi, Ci and Ki of four colors of YMCK.

The data Yi, Mi, Ci and Ki from the gradation correction means 240 are supplied to an image correction unit 250 as input image data to correct their pixel values as described later. Also, in this example, a color signal Sc from external equipment such as a computer is taken into the image processing unit 200 through an external equipment interface 280, and is supplied to the image correction unit 250 to correct their pixel values like the data Yi, Mi, Ci and Ki.

The image data from the image correction unit 250 after the correction are rotationally processed by a rotary processing unit 260 so that its time series direction becomes a direction corresponding to the main scanning direction of the image output unit 300, and are written in a page memory 270. More specifically, the image data from the image correction unit 250 after the correction are written in the page memory 270, and at this time, by the address of the page memory 270 being converted, the time series direction of the image data after the correction is set to a direction corresponding to the main scanning direction of the image output unit 300 on the page memory 270.

The data Yo, Mo, Co and Ko of four colors of YMCK from the page memory 270 after the correction, whose time series direction has been set to a direction corresponding to the main scanning direction of the image output unit 300, are read out as output image data from the image processing unit 200 and are sent to the image output unit 300.

As the transparent neutral density conversion means 210 and the gradation correction means 240, for example, an one-dimensional lookup table is used. As the color correction means 220, the linear masking method using a 3×3 matrix operation usually used often can be utilized, and the non-linear masking method of 3×6, 3×9 or the like may be used. Also, as the black printer form formation under color removal means 230, the skeleton UCR method usually used often can be used. However, any other well-known method may be used for both.

When a patch with an input dot coverage of 40% was outputted in black single color as the half tone portion 1 shown in FIG. 11(A) with a number of screen lines at the screen generator 390 as 400 lines/inch at an image forming apparatus of the aforesaid example, that is, a copying machine without correcting the pixel value as will be described later at the image correction unit 250 in the image processing unit 200, the density at the rear end portion 1B of the half tone portion 1 in contact with the background portion 2 lowered as shown by a broken line in FIG. 11(B).

Similarly, when a patch with an input dot coverage of 40% was outputted in magenta single color as the low density portion 12L shown in FIG. 12(A), with a number of screen lines at the screen generator 390 as 400 lines/inch without correcting the pixel value as will be described later at the image correction unit 250 in the image processing unit 200, the density at the rear end portion 12W of the lower density portion 12L in contact with the high density portion 13H lowered as shown by a broken line in FIG. 12(B). Similarly, when a patch with an input dot coverage of 100% was outputted in magenta single color as the high density portion 13H, quite the same result was obtained.

Figure 11A:
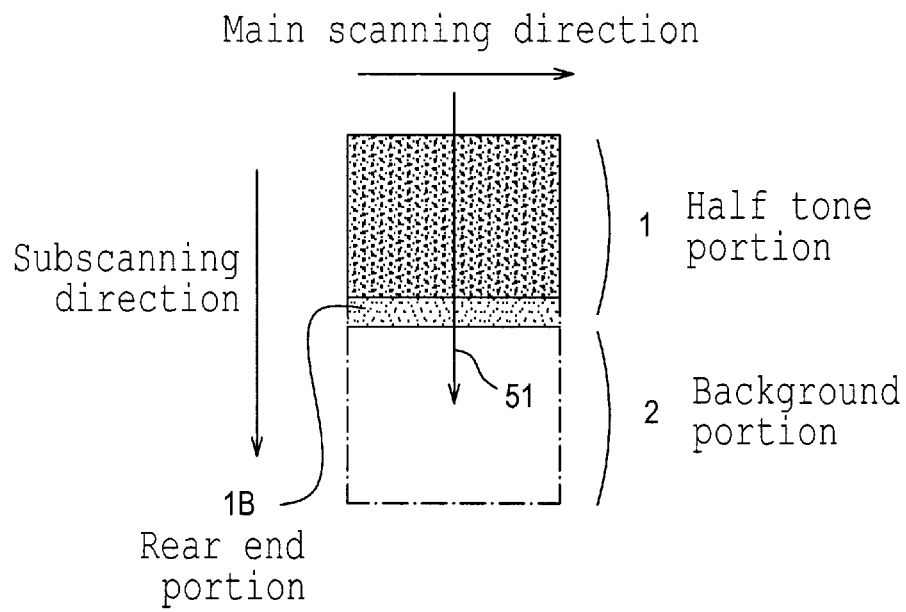
FIGS. 11(A) and 11(B) is a view showing en embodiment of lowered density at the half tone portion and that it is prevented by the present invention.
Figure 11B:
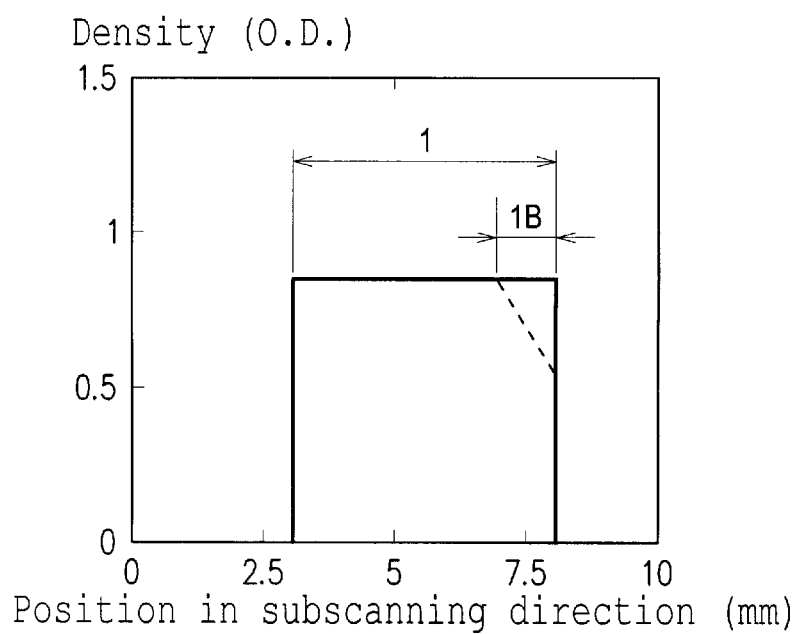
Figure 12A:
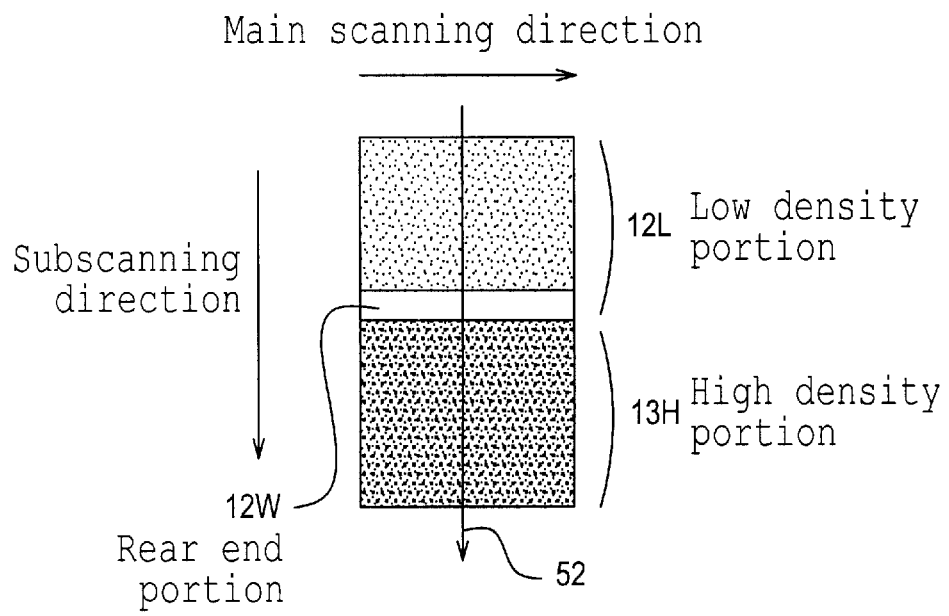
FIGS. 12(A) and 12(B) is a view showing en embodiment of lowered density at the low density portion and that it is prevented by the present invention.
Figure 12B:
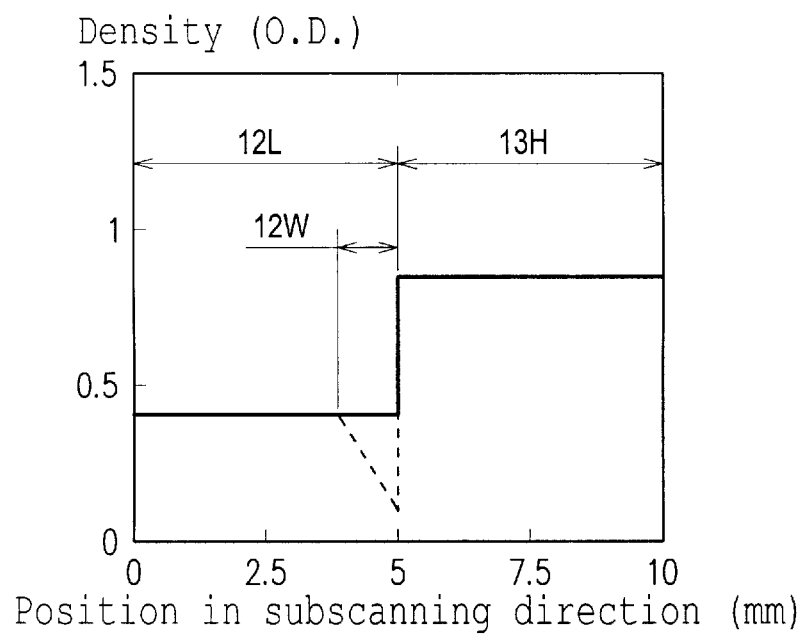

However, FIG. 11(B) shows the measurement of the density at the position indicated by an arrow 51 in FIG. 11(A), and FIG. 12(B) shows the measurement of the density at the position indicated by an arrow 52 in FIG. 11(A).

These lowered densities were recognized to become more noticeable when the number of screen lines at the screen generator 390 is increased. Also, when for the laser light scanner 380, one having a beam diameter of the laser light L in the main scanning direction of 20 μm was used, there was less decrease in the density at the rear end portions 1B and 12W. However, this leads to a large size and a high cost of the laser light scanner 380. Also, when the number of screen lines was increased, decrease in the density at the rear end portions 1B and 12W could not be reduced to such a degree that it was not perceptible even if the beam diameter of the laser light L in the main scanning direction was made smaller.

Figure 4:
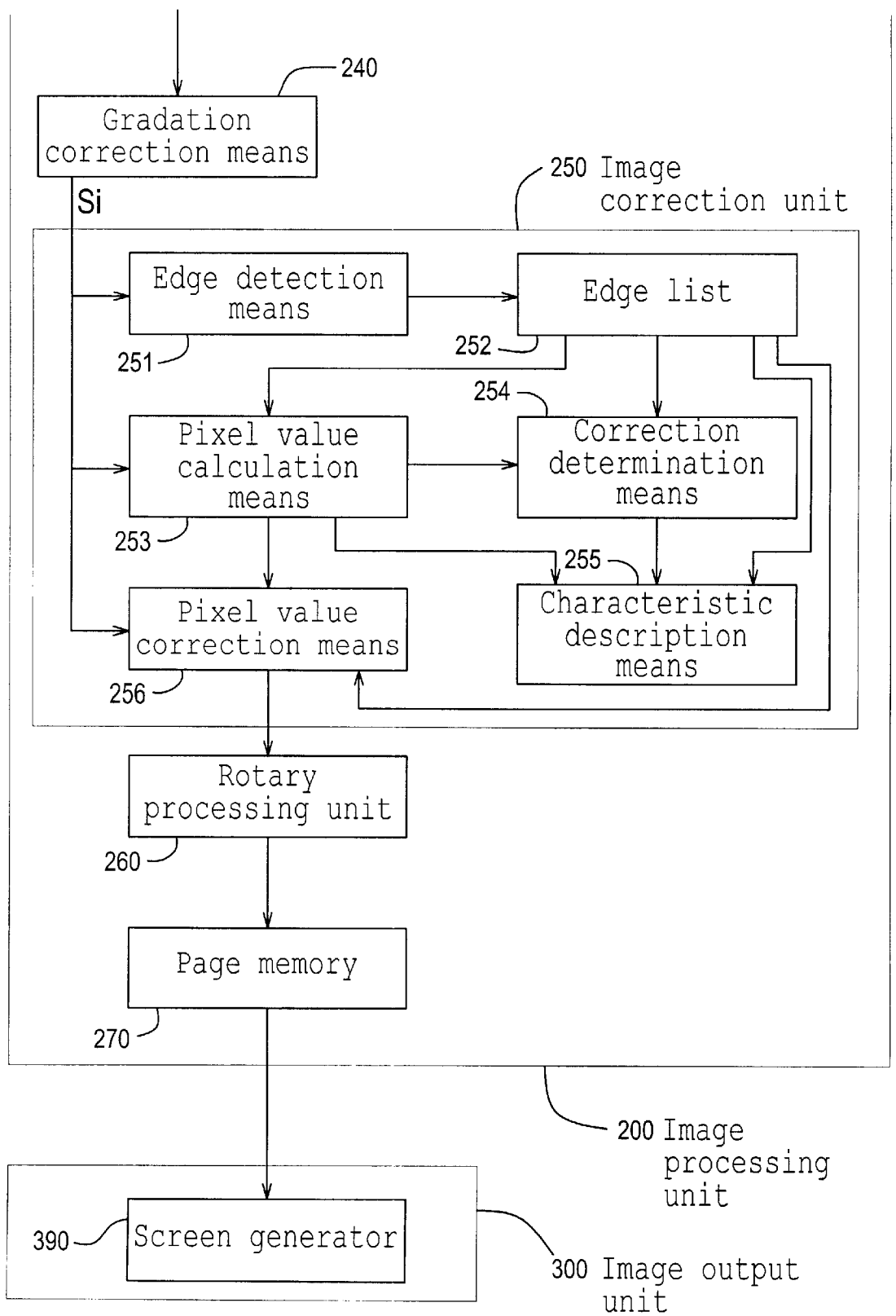
FIG. 4 is a view showing an example of an image correction unit of the image processing unit of FIG. 3.

In this example, however, the pixel value for the input image data from the gradation correction means 240 is corrected at the image correction unit 250 in the image processing unit 200. FIG. 4 shows a concrete example of the image correction unit 250, which is composed of edge detection means 251, an edge list 252, pixel value calculation means 253, correction determination means 254, characteristic description means 255, and pixel value correction means 256.

In the edge detection means 251, from the input image data Si, from the gradation correction means 240, whose time series direction has been set to a direction corresponding to the subscanning direction of the image output unit 300 as described above, the position, direction, and pixel value of the image edge can be detected.

In an image forming apparatus of the electrophotographic type, a pixel with a dot coverage of under 5% is generally difficult to be reproduced at the image output unit. Therefore, the half tone portion 1 here has a pixel value of 5 to 100% at gradation stage, and the background portion 2 has a pixel value of 0 to 5% at gradation stage.

Also, if the difference in density between the half tone portion 1 and the background portion 2 or the difference in density between the low density portion 12L and the high density portion 13H is not less than 10% in dot coverage, the density at the rear end portion 1B of the half tone portion 1 in contact with the background portion 2, or the density at the rear end portion 12W of the low density portion 12L in contact with the high density portion 13H really lowers for the aforesaid reason. Therefore, the low density portion 12L here has a pixel value of 5 to 90% in gradation stage, and the high density portion 13H has a pixel value of 15 to 100% in gradation stage. Also, the half tone portion 1 has actually a pixel value of 15 to 100% in gradation stage.

Concretely, when it stores, in a memory, pixel values of pixels continuous in a direction corresponding to the subscanning direction of the image output unit 300 and the pixel value increases or decreases by 10% or more within a specified number of pixels, or within, for example, several pixels, the edge detection means 251 detects, with a pixel immediately before the pixel value increases or decreases as an edge pixel, the position, edge direction, and pixel value of the edge pixel.

Figure 5:
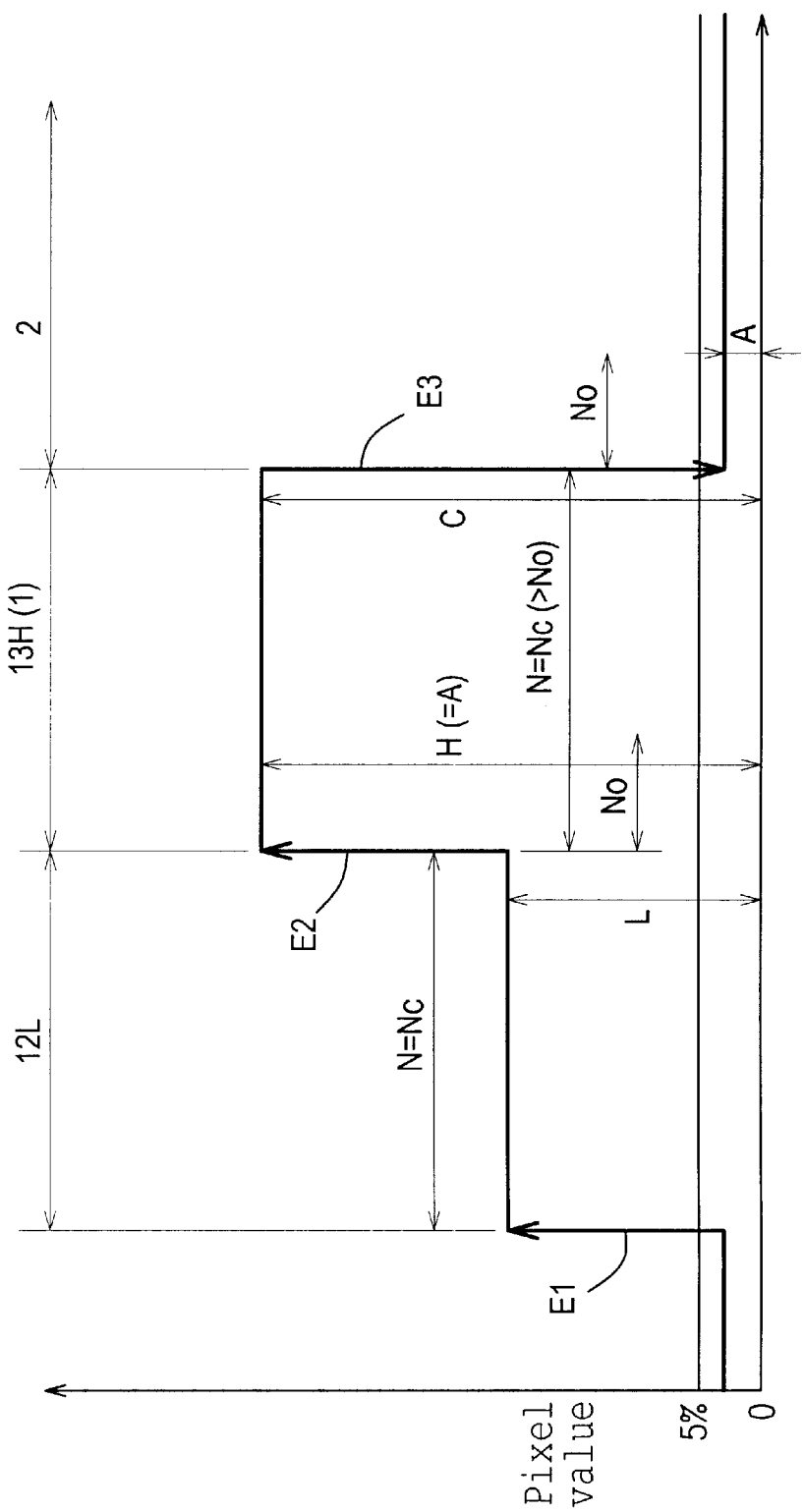
FIG. 5 is an explanatory view illustrating an image edge detected by edge detection means of the image correction unit of FIG. 4.

For example, when the pixel value of input image data Si in one main scanning line of the image input unit 100 varies as shown by a solid line in FIG. 5, the edge detection means 251 detects the positions, directions, and pixel values of edges E1, E2 and E3 in FIG. 5.

The edge information detected by the edge detection means 251, that is, the position, direction and pixel value of the image edge are recorded in the edge list 252.

On the basis of edge information from the edge list 252 and input image data Si from the gradation correction means 240, pixel value calculation means 253 calculates, when the number of pixels from a certain edge to the next edge in the reverse direction in the time series direction of the input image data Si, that is, in the subscanning direction of the image output unit 300 exceeds a specified pixel number No, the average value of pixel values of pixels from the certain edge to the specified pixel number No as the pixel value A of the image after the edge, and calculates, when the number of pixels from a certain edge to the next edge in the reverse direction is under the specified pixel number No, the average value of pixel values of pixels from the certain edge to the next edge in the reverse direction.

More specifically, when edges E1, E2 and E3 shown in FIG. 5 are detected at the edge detection means 251, the pixel value calculation means 253 calculates the average value of pixel values of pixels from the edge E2 to the specified pixel number No as pixel value A of the image after the edge E2, that is, pixel value H of the high density portion 13H or the half tone portion 1 because the number of pixels Nc from the edge E2 to the next edge E3 in the reverse direction exceeds the specified pixel number No. Also, the pixel value calculation means 253 calculates the average value of pixel values of pixels from the edge E3 to the specified pixel number No as pixel value A of the image after the edge E3, that is, the pixel value of the background portion 2 because the number of pixels from the edge E3 to the next edge in the reverse direction exceeds the specified pixel number No.

If an image forming apparatus, a copying machine in this example, has resolution of 16 dpm (400 dpi), the specified pixel number No is, for example, set to 32 pixels, ½ of 64 pixels described above.

Also, the pixel value calculation means 253 calculates the number of pixels N from a certain edge to the next edge at the same time. More specifically, when the edge detection means 251 detects the edges E1, E2 and E3 shown in FIG. 5, the pixel value calculation means 253 calculates the number of pixels N=Ne from the edge E1 to the edge E2, and also the number of pixels N=Nc from the edge E2 to the edge E3.

On the basis of the edge information from the edge list 252 and the aforesaid pixel value A from the pixel value calculation means 253, the correction determination means 254 determines whether or not correction of the pixel value of the input image data Si is required, and its form.

More specifically, when the edge detection means 251 detects the edges E1, E2 and E3 shown in FIG. 5, the correction determination means 254 determines that the edge E1 is an edge whose pixel value increases by 10% or more from a value under 5% and which changes from the background portion to the low density portion 12L or the half tone portion, and that the pixel values before it are not corrected. As regards the edge E2, it determines as an edge which changes from the low density portion 12L to the high density portion 13H, and that the pixel values before it are corrected so as to prevent decrease in the density at the low density portion. As regards the edge E3, since the aforesaid pixel value A of the image thereafter becomes under 5%, it determines as an edge which changes from the half tone portion 1 to the background portion 2, and that the pixel values before it are corrected so as to prevent decrease in the density at the half tone portion.

The characteristic properties of decrease in the density at the half tone portion and decrease in the density at the low density portion are described in the characteristic description means 255 in advance as described later. The characteristic description means 255 reads the characteristic properties of decrease in the density at the half tone portion or decrease in the density at the low density portion in accordance with determination result from the correction determination means 254, edge information from the edge list 252 and the aforesaid pixel value A from the pixel value calculation means 253 for sending them to the pixel value correction means 256.

The pixel value correction means 256 corrects the pixel value of input image data Si from the gradation correction means 240 on the basis of the characteristic properties read from the characteristic description means 255, edge information from the edge list 252, and the foresaid number of pixels N from the pixel value calculation means 253.

Figure 18A:
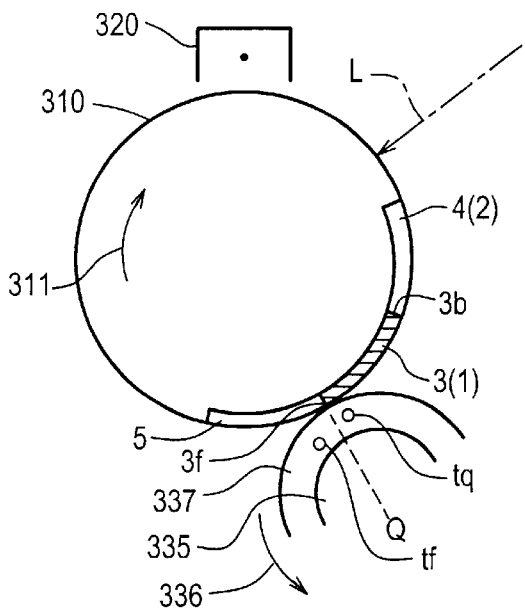
FIGS. 18(A)–18(C) is a view showing a reason why decrease in the density at the half tone portion occurs.
Figure 18B:
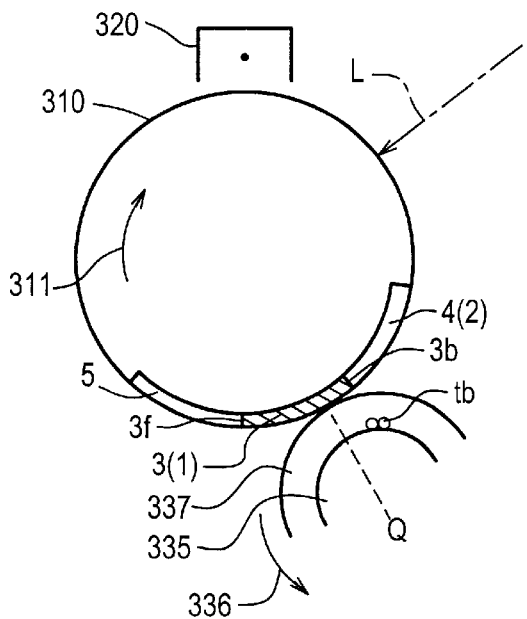
Figure 18C:
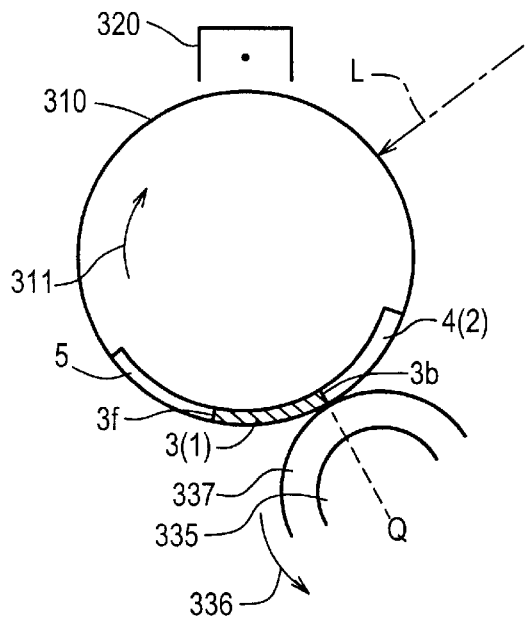

As is apparent from the reason for decrease in the density at the half tone portion shown in FIG. 18, the range of the rear end portion 1B where decrease in the density of the half tone portion 1 occurs and the amount of lowered density at the rear end portion 1B depend upon the latent image potential in the half tone portion 1 on the photosensitive drum 310, accordingly the pixel value of the half tone portion 1, that is, the pixel value C at the rear edge of the half tone portion 1 in contact with the background portion 2.

Figure 19A:
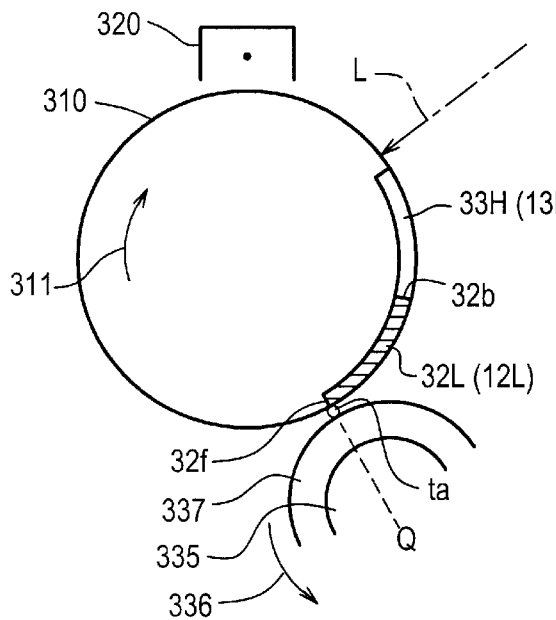
FIGS. 19(A)–19(C) is a view showing a reason why decrease in the density at the low density portion occurs.
Figure 19B:
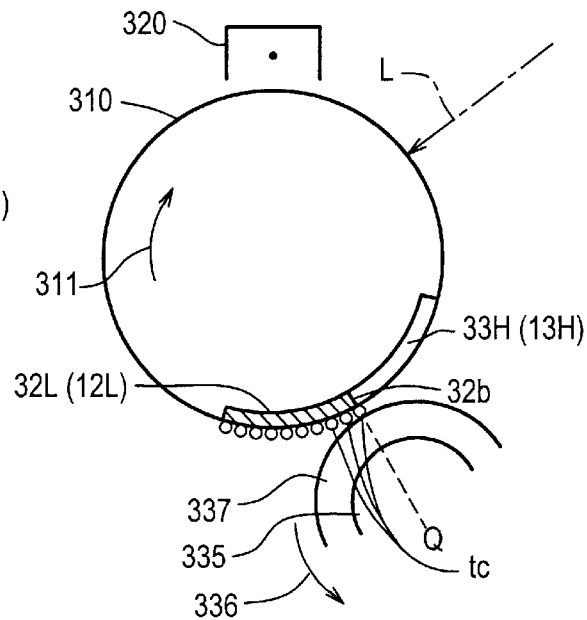
Figure 19C:
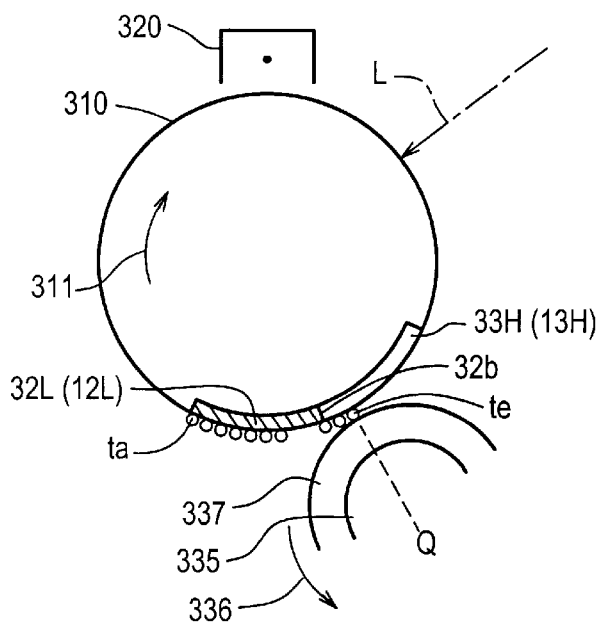

As is apparent from the reason for decrease in the density at the low density portion shown in FIG. 19, the range of the rear end portion 12W where decrease in the density of the low density portion 12L occurs, and the amount of lowered density at the rear end portion 12W depend upon the difference between the latent image potential at the low density portion 12L and that at the high density portion 13H on the photosensitive drum 310, accordingly the difference between the pixel value L of the low density portion 12L and the pixel value H of the high density portion 13H.

Figure 6A:
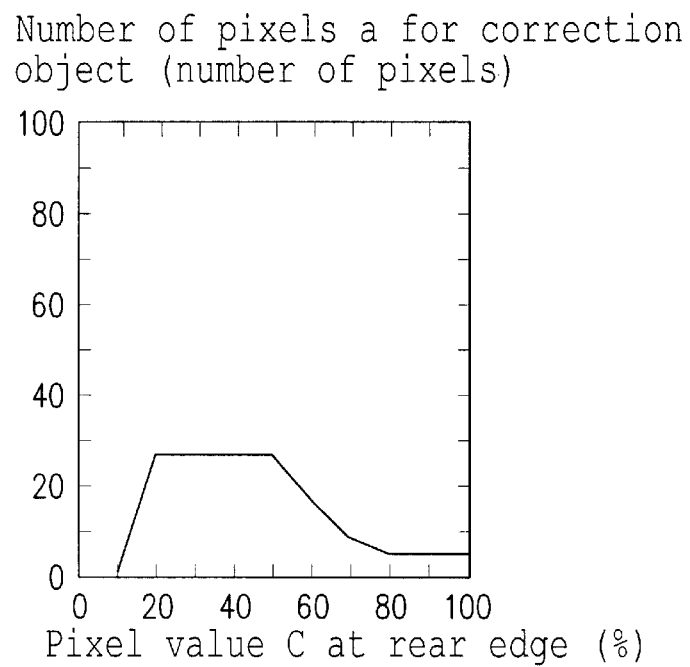
FIGS. 6(A) and 6(B) is a view showing an example of content described in characteristic description means of the image correction unit of FIG. 4.
Figure 6B:
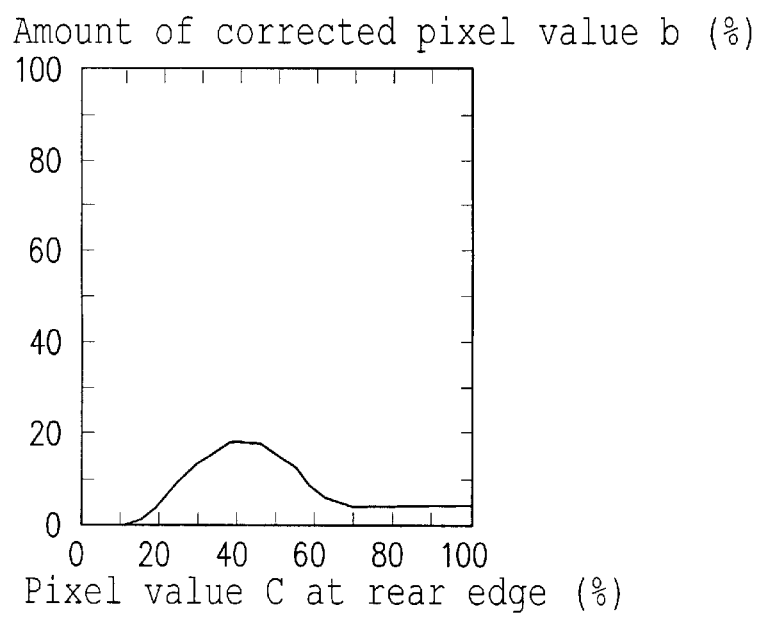

Thus, the characteristic description means 255 is provided with a set of LUTs (Look Up Tables) for correcting decrease in the density at the half tone portion and a plurality of LUTs for correcting decrease in the density at the low density portion. In one LUT for correcting decrease in the density at the half tone portion, the relationship of the number of pixels a for correction object with respect to the pixel value C at the rear edge of the half tone portion 1 is stored as shown in FIG. 6(A), and in the other LUT, the relationship of the amount of corrected pixel value b (dot coverage) at the rear edge with respect to the pixel value C at the rear edge of the half tone portion 1 is stored as shown in FIG. 6(B). The number of pixels a for correction object corresponds to the range of the rear end portion 1B where decrease in the density of the half tone portion 1 occurs, and the amount of corrected pixel values b corresponds to the amount of lowered density at the rear edge of the half tone portion 1.

Figure 7A:
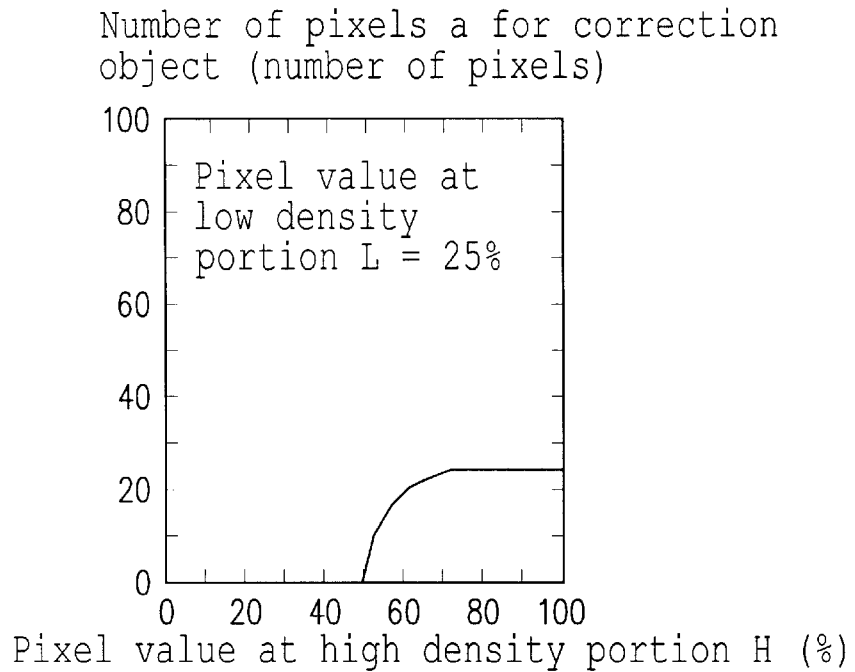
FIGS. 7(A) and 7(B) is a view showing an example of content described in the characteristic description means of the image correction unit of FIG. 4.
Figure 7B:
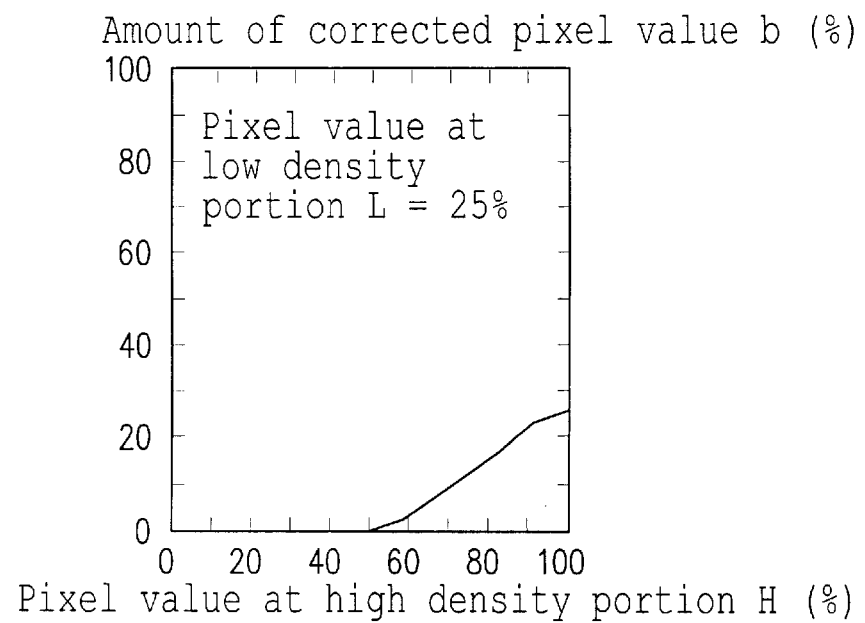

As the plurality of LUTs for correcting decrease in the density at the low density portion, there are provided a LUT showing numbers of pixels a for correction object with respect to the pixel value H at the high density portion (dot coverage) for each of respective values for the pixel value L at the low density portion (dot coverage) as shown in FIG. 7(A), and a LUT showing amounts of corrected pixel value b (dot coverage) with respect to the pixel value H (dot coverage) at the high density portion for each of respective values for the pixel value L at the low density portion (dot coverage) as shown in FIG. 7(B). The number of pixels a for correction object corresponds to the range of the rear end portion 12W where decrease in the density at the low density portion 12L occurs, and the amount of corrected pixel value b corresponds to the amount of lowered density at the rear end of the low density portion 12L.

Figure 8:
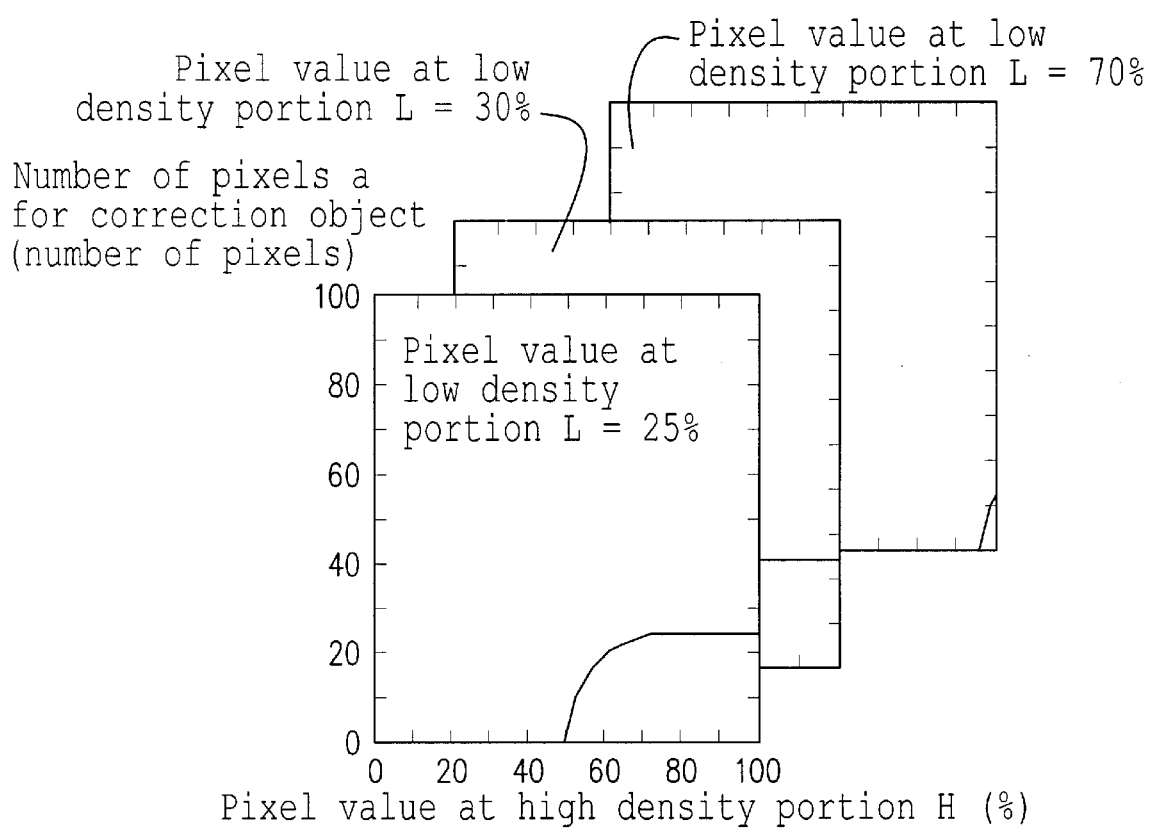
FIG. 8 is a view showing an example of content described in the characteristic description means of the image correction unit of FIG. 4.

If, however, LUTs are provided for all values for the pixel value L at the low density portion, the amount of data will become enormous. Thus, there may be provided a LUT showing the number of pixels a for correction object with respect to the pixel value H at the high density portion or the amount of corrected pixel value b for values of every, for example, 5% of the pixel value L at the low density portion as shown in FIG. 8 in such a manner that, as to values for which no LUT for the pixel value L at the low density portion exists, the number of pixels a for correction object and the amount of corrected pixel value b read out from the LUT for values before and after those values through the pixel value H at the high density portion are supplemented to thereby determine the number of pixels a for correction object and the amount of corrected pixel value b corresponding to the pixel value L at the low density portion, which is the pixel value, from the edge list 252, at the rear edge of the low density portion 12L, and the pixel value H at the high density portion calculated as the pixel value A by the pixel value calculation means 253 as described above respectively.

Also, decrease in the density at the low density portion becomes in proportion to a difference in exposure energy between on the low density portion 12L and on the high density portion 13H. Thus, there may be prepared a LUT in which relationship between the pixel value and the exposure energy (potential) is described as shown in FIG. 9(A) and LUTs in which relationship between the difference in exposure energy, and the number of pixels a for correction object and the amount of corrected pixel value b is described respectively as shown in FIGS. 9(B) and (C).

Figure 9A:
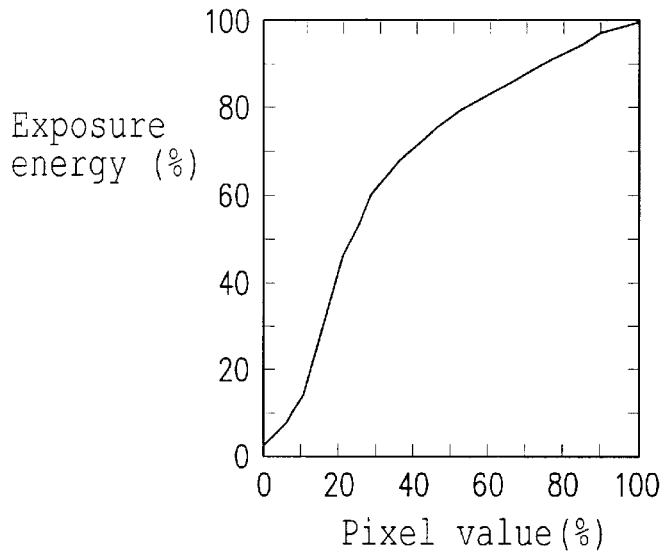
FIGS. 9(A)–9(C) is a view showing an example of content described in the characteristic description means of the image correction unit of FIG. 4.
Figure 9B:
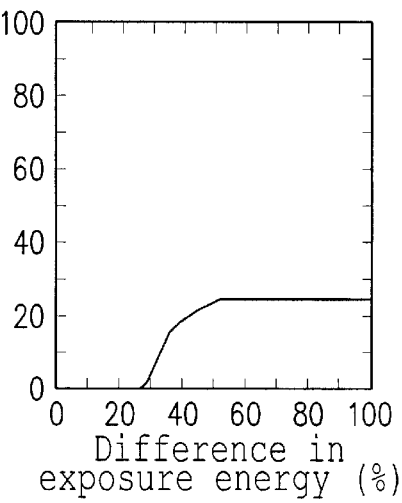
Figure 9C:
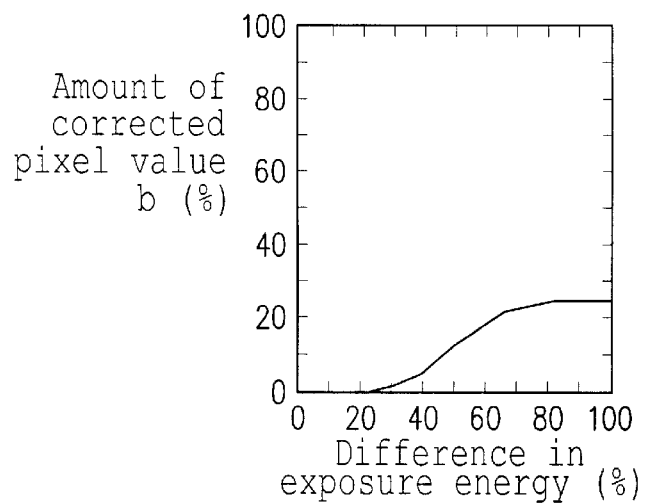

In this case, concerning each of the pixel value L at the low density portion from the edge list 252 and the pixel value H at the high density portion from the pixel value calculation means 253, the exposure energy is determined from the LUT in FIG. 9(A), and from a difference between the two, the number of pixels a for correction object and the amount of corrected pixel value b are determined using LUTs shown in FIGS. 9(B) and (C). By doing so, it is possible to determine the number of pixels a for correction object and the amount of corrected pixel value b, which correspond to the pixel value L at the low density portion and the pixel value H at the high density portion respectively, by means of only three LUTs.

The pixel value correction means 256 first discriminates the correction of decrease in the density at the half tone portion from the correction of decrease in the density at the low density portion. In the case of the correction of decrease in the density at the half tone portion, the pixel value correction means 256 corrects, as below, the pixel value of the input image data Si from the gradation correction means 240 on the basis of the position xo of the rear edge of the half tone portion 1 from the edge list 252, the number of pixels Nc of the half tone portion 1 from the pixel value calculation means 253, and the number of pixels a for correction object and the amount of corrected pixel value b from the LUT for correcting decrease in the density at the half tone portion in the characteristic description means 255. In the case of the correction of decrease in the density at the low density portion, the pixel value correction means 256 corrects, as below, the pixel value of the input image data Si from the gradation correction means 240 on the basis of the position xo of the rear edge of the low density portion 12L from the edge list 252, the number of pixels Ne of the low density portion 12L from the pixel value calculation means 253, and the number of pixels a for correction object and the amount of corrected pixel value b from the LUT for correcting decrease in the density at the low density portion in the characteristic description means 255, or based thereon.

As shown by a broken line in FIG. 11(B) and FIG. 12(B), the amounts of lowered density in the half tone portion 1 and the low density portion 12L tend to change substantially linearly within the range in which decrease in the density occurs. Thus, the pixel value correction means 256 corrects the pixel value of the input image data Si using a linear expression as below.

Figure 10A:
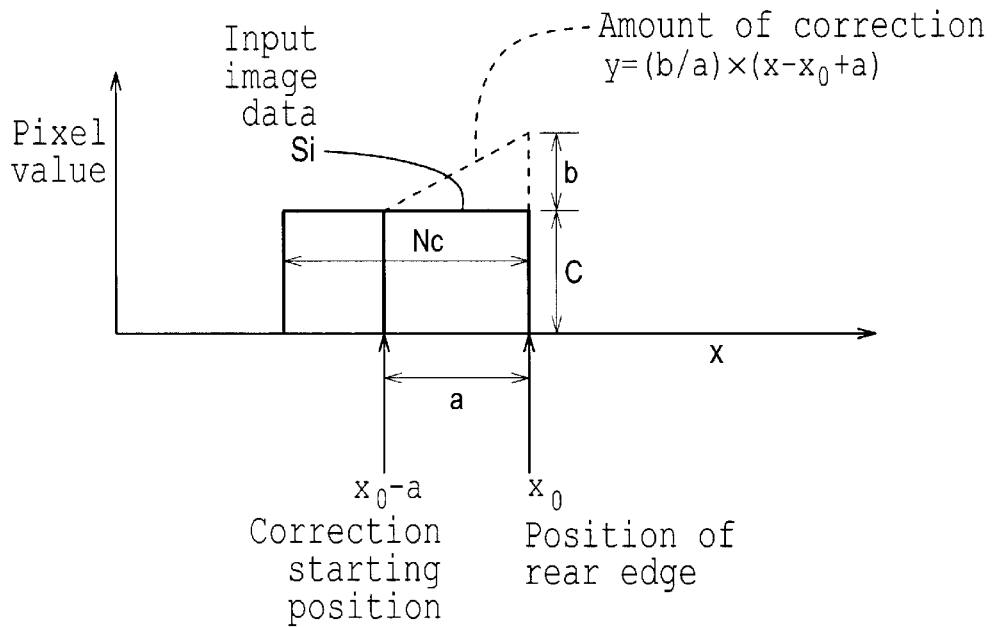
FIGS. 10(A) and 10(B) is a view showing an example of an embodiment in which a pixel value is corrected by pixel value correction means of the image correction unit of FIG. 4.

More specifically, in the case of decrease in the density at the half tone portion 1, if the number of pixels Nc in the half tone portion 1 exceeds the number of pixels a for correction object, assuming the pixel position of the input image data Si in the time series direction to be x as shown in FIG. 10(A) and the rear edge position of the half tone portion 1 to be xo as described above, an amount of correction y expressed by the following linear expression is calculated, and the amount of correction y thus calculated is added to the original pixel value of the pixel of correction object within a range of $xo-a \leq x \leq xo$.

$$Y=(b/a)\times\{x-(xo-a)\}$$
$$=(b/a)\times(x-xo+a) \qquad (1)$$

If the number of pixels Nc of the half tone portion 1 is smaller than the number of pixels a for correction object, an amount of correction y expressed by the following linear expression is calculated, and the amount of correction y thus calculated is added to the original pixel value of the pixel for correction object within a range of $xo-Nc \leq x \leq xo$. In other words, in this case, the pixel for correction object is confined to the range of the number of pixels Nc of the half tone portion 1, and the amount of correction y is decreased as compared with the aforesaid case accordingly.

$$Y=(b/a)\times(x-xo+Nc) \qquad (2)$$

Figure 10B:
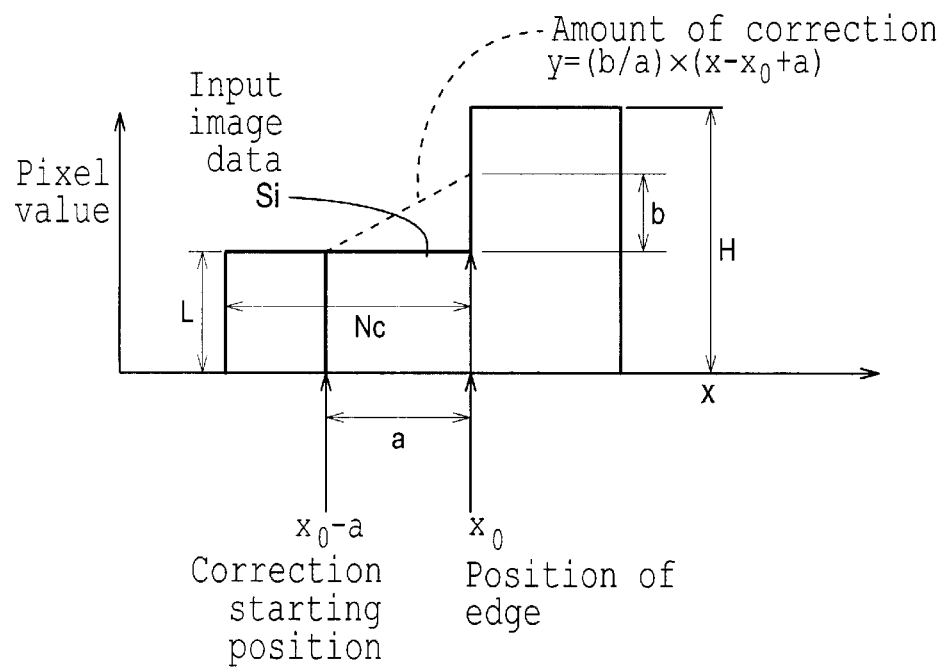

Also, in the case of decrease in the density at the low density portion, if the number of pixels Ne of the low density portion 12L exceeds the number of pixels a for correction object, assuming the pixel position of the input image data Si in the time series direction to be x as shown in FIG. 10(B) and the rear edge position of the low density portion 12L to be xo as described above, an amount of correction y expressed by the following linear expression is calculated, and the amount of correction y thus calculated is added to the original pixel value of the pixel of correction object within a range of $xo-a \leq x \leq xo$.

$$y=(b/a)\times(x-xo+a) \qquad (3)$$

If the number of pixels Ne of the low density portion 12L is smaller than the number of pixels a for correction object, the amount of correction y expressed by the following linear expression is calculated, and the amount of correction y thus calculated is added to the original pixel value of the pixel for correction object within a range of $xo-Ne \leq x \leq xo$. In other words, in this case, the pixel for correction object is confined to the range of the number of pixels Ne of the low density portion 12L, and the amount of correction y is decreased as compared with the aforesaid case accordingly.

$$Y=(b/a)\times(x-xo+Ne) \qquad (4)$$

The image data from the pixel value correction means 256 in the image correction unit 250 after the correction is rotationally processed at the rotary processing unit 260 as described above so that its time series direction becomes a direction corresponding to the main scanning direction of the image output unit 300, and is written in the page memory 270.

In an image forming apparatus of the aforesaid example, that is, a copying machine, when a patch with an input dot coverage of 40% was outputted in black single color as the half tone portion 1 shown in FIG. 11(A) with a number of screen lines at the screen generator 390 as 400 lines/inch by correcting the pixel value as described above at the image correction unit 250 of the image processing unit 200, decrease in the density did not occur in the half tone portion 1 as shown by a solid line in FIG. 11(B).

Similarly, when a patch with an input dot coverage of 40% as the low density portion 12L shown in FIG. 12(A) was outputted in magenta single color with the number of screen lines at the screen generator 390 as 400 lines/inch by performing the aforesaid correction of pixel value at the image correction unit 250 in the image processing unit 200, decrease in the density did not occur at the low density portion 12L as shown by a solid line in FIG. 12(B). Also, when a patch with an input dot coverage of 100% as the high density portion 13H was outputted in magenta single color, decrease in the density did not occur at the low density portion 12L as shown by a solid line in FIG. 12(B).

FIG. 11(B) shows the measurement of density at the position indicated by an arrow 51 in FIG. 11(A), and FIG. 12(B) shows the measurement of density at the position indicated by an arrow 52 in FIG. 12(A).

The aforesaid example shows a case where the amount of correction y is calculated from a linear expression expressed by equations (1) to (4), and the amount of correction y may be calculated by another functional expression in accordance with the characteristic properties of decrease in the density at the half tone portion and decrease in the density at the low density portion.

Also, the aforesaid example shows a case where the number of pixels a for correction object and the amount of corrected pixel value b which are common for each color of YMCK are described in the characteristic description means 255, and there may be prepared LUTs, in which the number of pixels a for correction object and the amount of corrected pixel value b for each color have been stored. Also, there may be described the number of pixels a for correction object and the amount of corrected pixel value b which are different for each number of screen lines at the image output unit 300.

Further, instead of using any LUT in the characteristic description means 255, a coefficient of a functional expression when relation between the number of pixels a for correction object and the amount of corrected pixel value b, and such pixel value C at the rear edge of the half tone portion 1 as shown in FIG. 6 is expressed by the functional expression, and a coefficient of a functional expression when relation between the number of pixels a for correction object and the amount of corrected pixel value b, and such pixel value L at the low density portion and pixel value H at the high density portion as shown in FIG. 7 is expressed by the functional expression, may be maintained at the characteristic description means 255 to calculate the number of pixels a for correction object and the amount of corrected pixel value b using those coefficients.

In this respect, for the edge detection means 251, means for obtaining a primary differential value for an image such as gradient by the digital filter process, means using pattern matching or another method may be used so long as an image edge can be detected as described above.

Figure 20A:
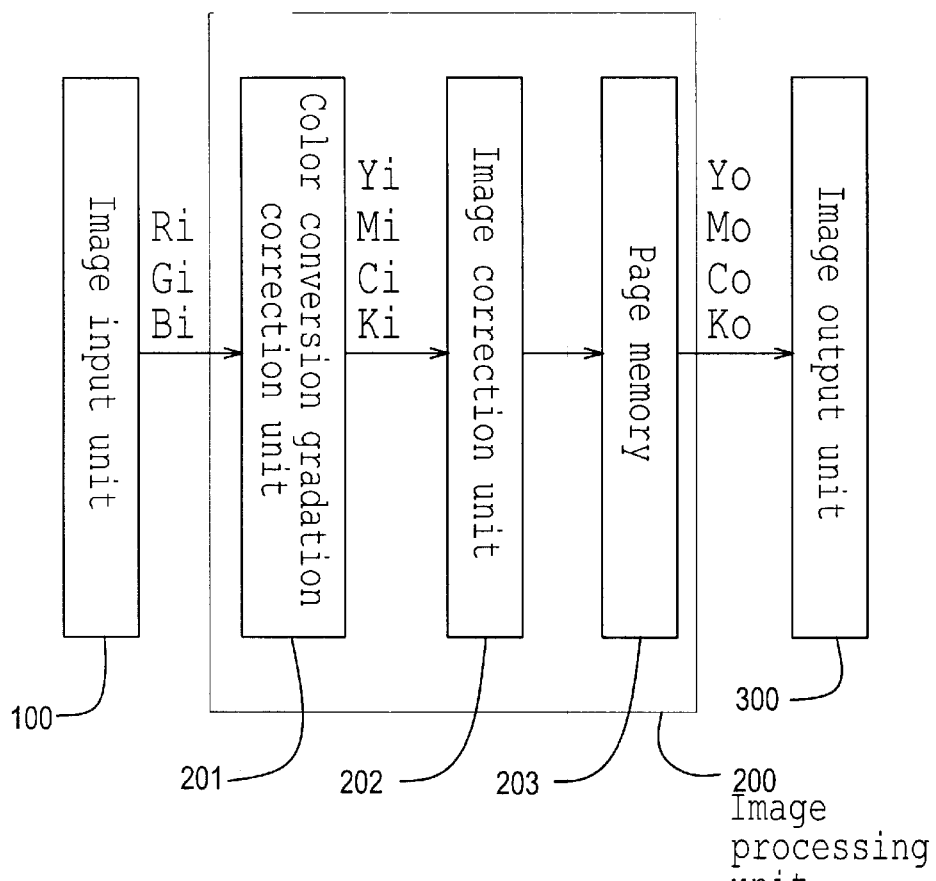
FIGS. 20(A) and 20(B) is a view showing an example of a conceivable image processing device.
Figure 20B:
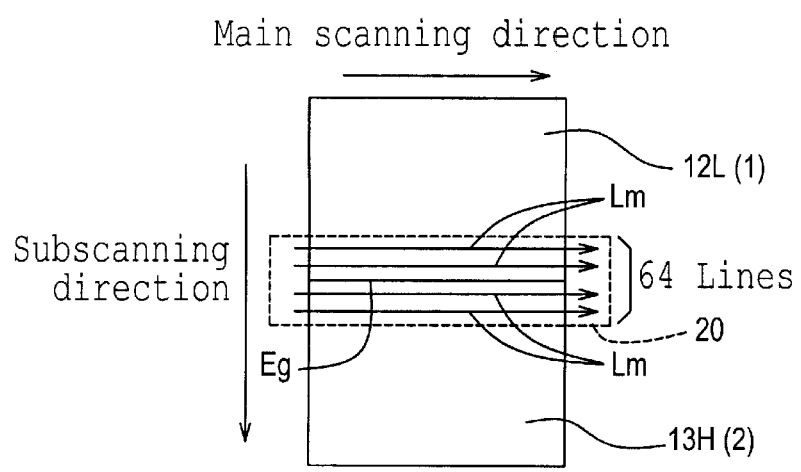
Figure 21A:
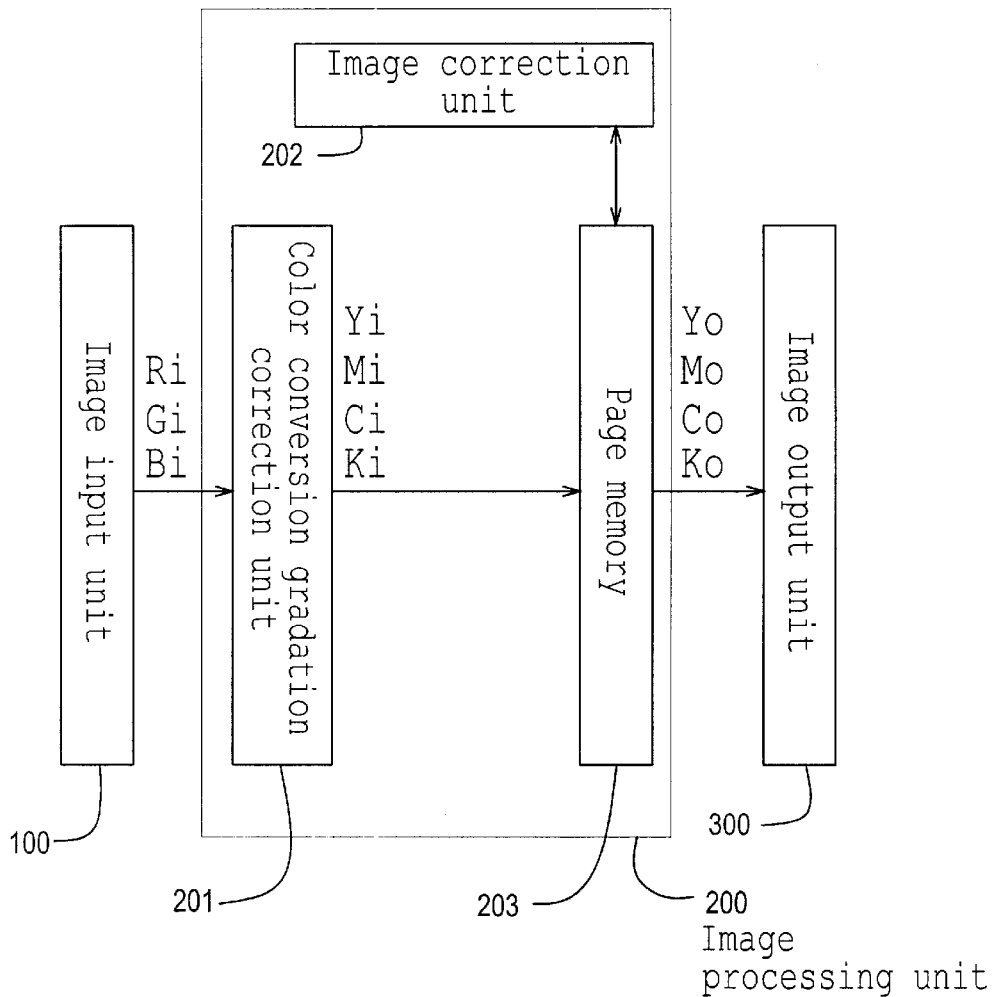
FIGS. 21(A) and 21(B) is a view showing an example of a conceivable image processing device.
Figure 21B:
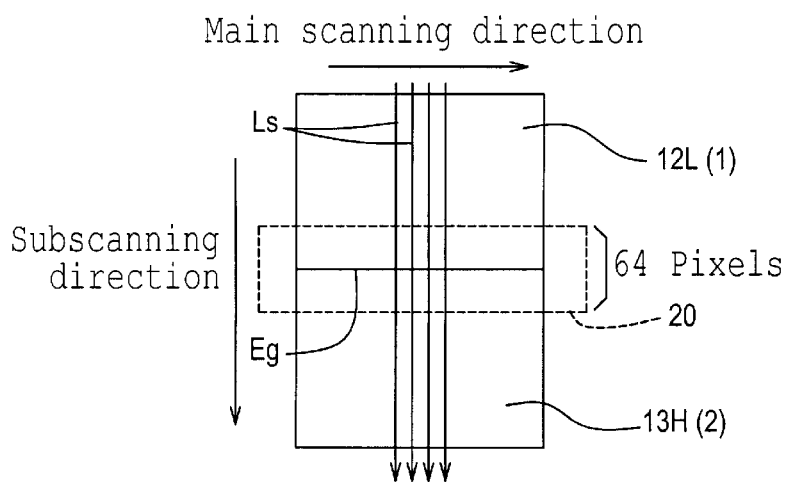

According to this example, in order to correct the image data so as to supplement the amount of lowered density due to the image output characteristics of the image output device 300 in the subscanning direction, it is not necessary to store, in a correction memory, image data of as an enormous amount of pixels as hundreds of thousands, extending over several thousands of pixels in the main scanning direction of the image output device 300 and extending over several tens of lines in the subscanning direction for two-dimensional image processing, unlike a case where the input image data, whose time series direction becomes a direction corresponding to the main scanning direction of the image output device 300, can be obtained from the image input unit 100 as shown in FIG. 20. It is possible to correct the image data at high speed with a small scale circuit and yet by real-time processing by one-dimensional image processing which processes image data of several tens of pixels continuous in a direction corresponding to the subscanning direction in the image output device 300 at the same time.

Moreover, since the pixel value for the image data is corrected so as to supplement the amount of lowered density, it becomes possible to avoid a large size and a high cost of the image output unit 300 while achieving higher resolution of the output image by an increase in the number of screen lines as in a case where the degree of accuracy of a laser light scanner 380, which is means of writing an electrostatic latent image, is increased to thereby enhance the contrast of the development field for preventing decrease in the density.

<Second Embodiment . . . FIG. 13 to FIG. 16>

Figure 13:
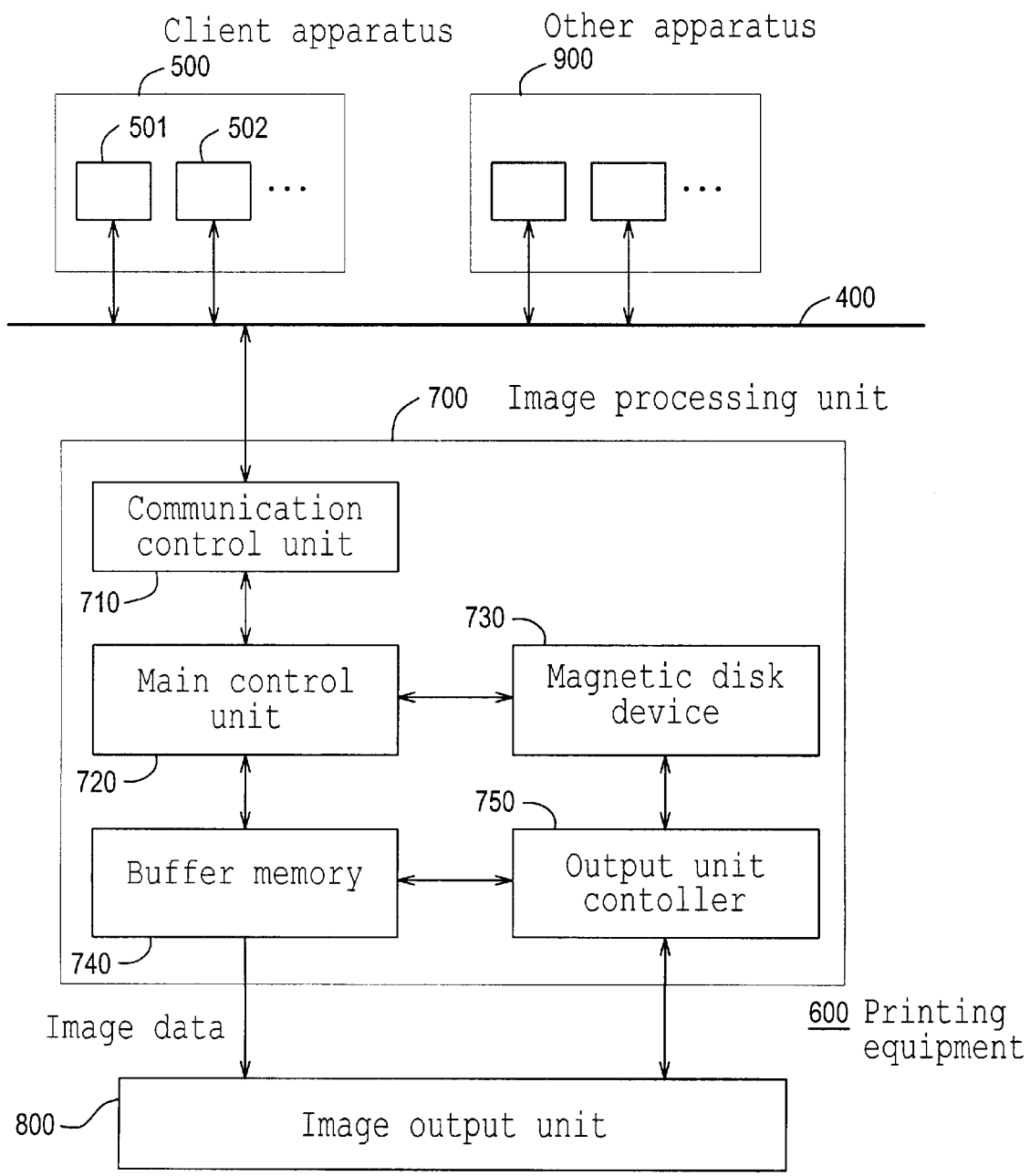
FIG. 13 is a view showing the general construction of a network printer system using an example of an image processing device according to the present invention.

FIG. 13 shows the general construction of a network printer system using an example of an image processing device according to the present invention, and an example of an image forming apparatus according to the present invention. In this network printer system, a client apparatus 500, printing equipment 600, and other apparatuses 900 are connected to a network 400.

As regards the network 400, in, for example, Ethernet (trade mark of Xerox Corp. U.S.A.), it is said that a plurality of protocols operate in accordance with the application of the client apparatus 500, the printing equipment 600 and other apparatuses 900.

The client apparatus 500 is composed of a plurality of client devices 501, 502, . . . , and each of the client devices consists of a computer, a work station, and the like to send print information described in PDL to the printing equipment 600 and other apparatuses 900 respectively.

This network printer system corresponds to OPI (Open PrePress Interface: trade mark of Aldus Corp. U.S.A.) system, and the print information described in PDL from the client apparatus 500, that is, PDL command/data may contain OPI command corresponding to the OPI system.

The OPI system is connected to a client apparatus and a plurality of printing equipment through networks, such that at least one of the plurality of printing equipment retains image data of high resolution in the storage unit, the client apparatus performs an editing process on the basis of low resolution information corresponding to the high resolution image data, and the printing equipment for, retaining the high resolution image data outputs high resolution image data on the basis of print information for the page layout program from the client apparatus, and is capable of performing a page layout process for image data without increasing the traffic on the networks and without increasing the load on the client apparatus.

The printing equipment 600 shows an example of an image forming apparatus according to the present invention, and corresponds to the aforesaid OPI system in this example. The printing equipment 600 is composed of the image processing unit 700 and the image output unit 800, and the image processing unit 700 shows an example of an image processing unit according to the present invention. The image output unit 800 uses the two-component magnetic brush development of the electrophotographic type in the same manner as the image output unit 300 of the first embodiment. The image processing unit 700 and the image output unit 800 may be physically provided as separate units, or the image processing unit 700 may be incorporated into the image output unit 800 to be made into one unit physically.

The other apparatuses 900 are other printing equipment than the printing equipment 600, server apparatuses such as a print server, a disk server and a mail server, and the like. These printing equipment, server apparatuses, and the like consist of a plurality of units respectively.

The image processing unit 700 in the printing equipment 600 is provided with a communication control unit 710, a main control unit 720, a magnetic disk device 730, a buffer memory 740 and an output unit controller 750.

The communication control unit 710 causes the image processing unit 700 to connect to the client apparatus 500 and other apparatuses 900 through the networks 400 to control the communication through, for example, CSMA/CD (Carrier Sense Multiple Access/Collision Detect) used as the control method for the Ethernet.

The information inputted from the client apparatus 500 or other apparatuses 900 into the image processing unit 700 by the communication control unit 710 is passed from the communication control unit 710 to the main control unit 720, which analyzes the communication protocol, and interprets and executes the PDL to develop the image data outputted by the image output unit 800.

In this case, a command to collectively rotate the image is given to the PDL command/data at the main control unit 720 as described later to develop image data whose time series direction becomes a direction corresponding to the subscanning direction of the image output unit 800. Thus, the pixel value of the image data developed is corrected, and the image data after the correction is rotationally processed so that its time series direction becomes a direction corresponding to the main scanning direction of the image output unit 800 to be written in the buffer memory 740 constituting the page memory.

In the magnetic disk device 730, there are installed an operating system, a device driver and application software, which control the entire image processing unit 700 including the communication control unit 710, the main control unit 720, the buffer memory 740 and the output unit controller 750, and the image output unit 800. These operating system and the like are loaded in a main storage unit, which is omitted in the figure, from the magnetic disk device 730 from time to time to be executed.

Also, in the magnetic disk device 730, the aforesaid high resolution image data corresponding to the OPI system is stored, and the high resolution image data is read out from the magnetic disk device 730 to the main control unit 720 through the aforesaid OPI command from time to time. In this respect, the magnetic disk device 730 can be utilized as a temporary data storage if the main storage unit or the buffer memory 740 is insufficient in capacity.

As described above, the output image data obtained at the main control unit 720 is temporarily stored in the buffer memory 740. Thus, the output unit controller 750 controls the buffer memory 740 while communicating with the image output unit 800, whereby the output image data is read out from the buffer memory 740 to be sent to the image output unit 800, and the output image can be obtained at the image output unit 800.

Figure 14:
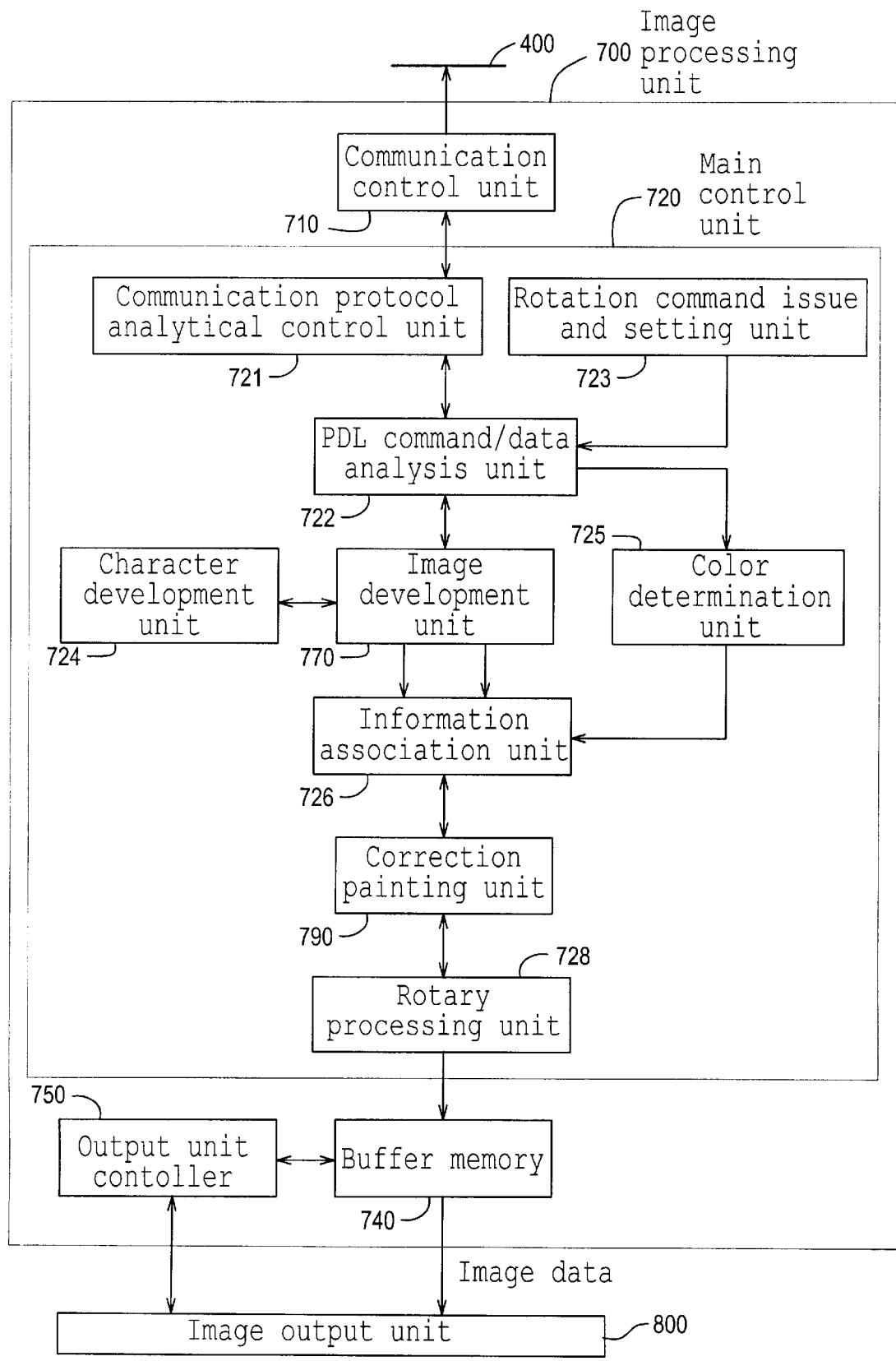
FIG. 14 is a view showing an example of an image processing unit in the system of FIG. 13.

As shown in FIG. 14, the main control unit 720 has a communication protocol analytical control unit 721, a PDL command/data analysis unit 722, a rotation command issue and setting unit 723, an image development unit 770, a character development unit 724, a color determination unit 725, an information association unit 726, a correction painting unit 790, and a rotary processing unit 728, and the communication protocol analytical control unit 721 is connected to the communication control unit 710, and the rotary processing unit 728 is connected to the buffer memory 740. In this respect, the magnetic disk device 730 shown in FIG. 13 is omitted in FIG. 14.

The information inputted into the communication controlunit 710 from the client apparatus 500 or other apparatuses 900 as described above is inputted into the communication protocol analytical control unit 721 from the communication control unit 710. This information inputted into the communication protocol analytical control unit 721 contains print information described in PDL in which read image information and code information mixedly exist, that is, PDL command/data. Also, the PDL command/data may contain the OPI command.

The communication protocol analytical control unit 721 analyzes the protocol of the information inputted, and transfers the PDL command/data, of the information inputted, to the PDL command/data analysis unit 722. The communication protocol analytical control unit 721 is said to correspond to the aforesaid plurality of protocols, and to support, for example, TCP/IP, AppleTalk (trade mark of Apple Corp. U.S.A.), and IPX/SPX.

When information is transmitted from the image processing unit 700 to the client apparatus 500 or other apparatuses 900, the communication protocol analytical control unit 721 controls the communication protocol adapted to the client apparatus 500 and other apparatuses 900 to output the information to the communication control unit 710.

The PDL command/data inputted into the PDL command/data analysis unit 722 through the communication control unit 710 and the communication protocol analytical control unit 721 are analyzed at the PDL command/data analysis unit 722. The PDL command/data analysis unit 722 analyzes a plurality of PDL including PostScript (trade mark of Adobe Systems Corp. U.S.A.), InterPress (trade mark of Xerox Corp. U.S.A.), and the like to convert into intermediate code data.

In this case, a command to rotate the image by 270 degrees in a clockwise direction is given to the PDL command/data analysis unit 722 from the rotation command issue and setting unit 723, and the PDL command/data analysis unit 722 analyzes the PDL in accordance with the rotation command.

Information on the resolution of the image output unit 800 and information on image shape such as contour, position, and rotation angle, which have been obtained at the PDL command/data analysis unit 722, are passed from the PDL command/data analysis unit 722 to the image development unit 770. The image development unit 770 develops the image data on the basis of these information in accordance with the rotation command so that its time series direction becomes a direction corresponding to the subscanning direction of the image output unit 800.

If the code data from the PDL command/data analysis unit 722 contains character information, the image development unit 770 takes in outline information from the character development unit 724 to develop the image data on characters. Also, the image development unit 770 performs various processes such as compression and extension of data, scaling up and scaling down, rotation and conversion into a mirror image, and resolution conversion of an image on the basis of the code data taking into consideration the rotation command.

The color determination unit 725 produces a parameter for converting the image data developed by the image development unit 770 into image data for each color of YMCK on the basis of the color information of the PDL command/data analyzed by the PDL command/data analysis unit 722 to send the parameter to the information association unit 726. The information association unit 726 converts the image data developed by the image development unit 770 into image data for each color of YMCK through the parameter from the color determination unit 725.

The image data for each color of YMCK from the information association unit 726 are supplied to the correction painting unit 790 as input image data, and the pixel value of the input image data is corrected at the correction painting unit 790 as described later.

Further, the image data for each color of YMCK from the correction painting unit 790 after the correction are compressed in a rotationally processable form, and are rotationally processed at the rotary processing unit 728 so that its time series direction becomes a direction corresponding to the main scanning direction of the image output unit 800 to be written in the buffer memory 740 as output image data.

The image data are read out for each color of YMCK from the buffer memory 740, and the image data thus read out are supplied to the image output unit 800.

Figure 15:
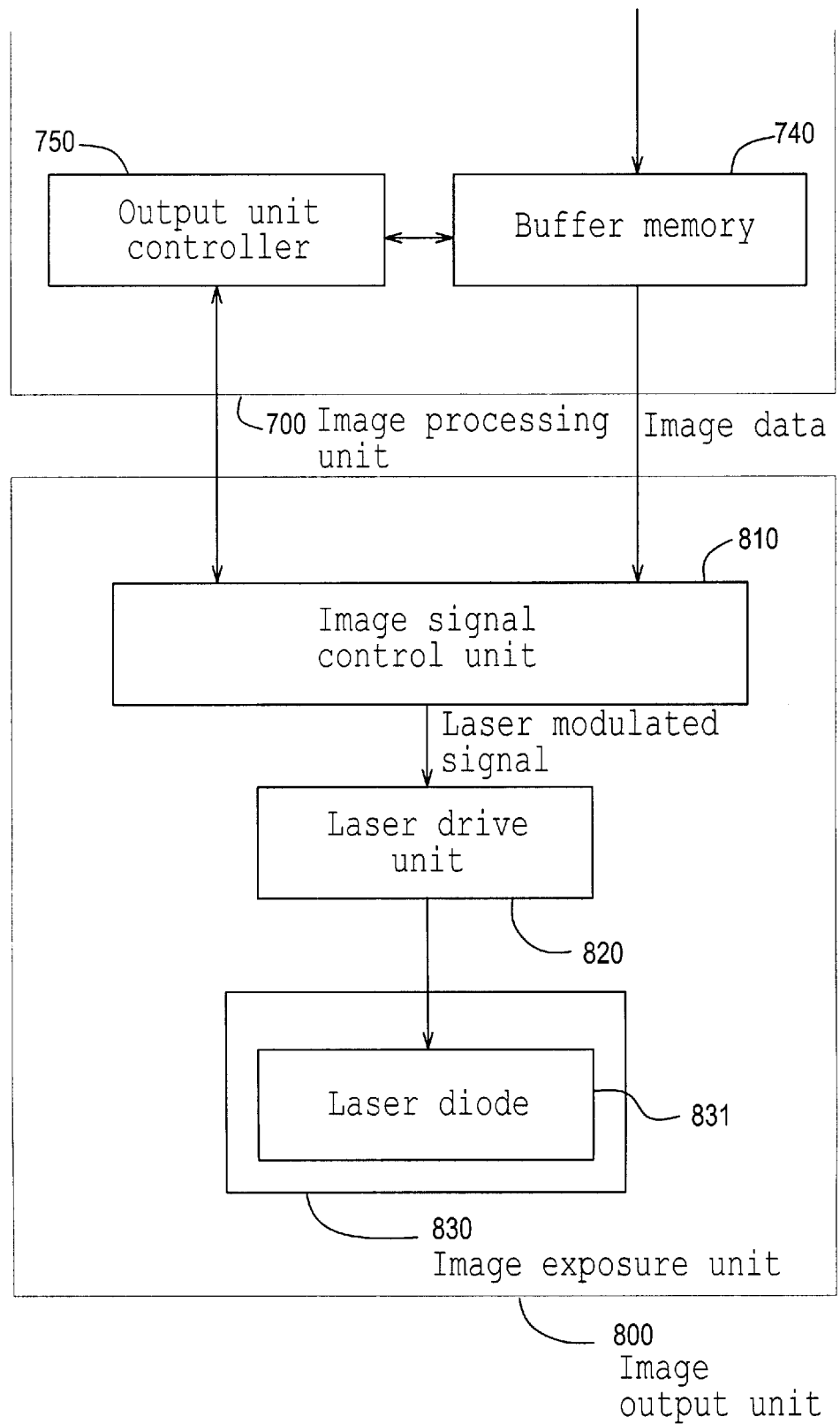
FIG. 15 is a view showing an example of an image output unit in the system of FIG. 13.

As shown in FIG. 15, the image output unit 800 is provided with an image signal control unit 810, a laser drive unit 820 and an image exposure unit 830. The image data read out from the buffer memory 740 in the image processing unit 700 are converted into a laser modulated signal by the image signal control unit 810, and the laser modulated signal is supplied to the laser drive unit 820, which drives a laser diode 831 in the image exposure unit 830.

In the image output unit 800, although omitted in FIG. 15, the laser light from the laser diode 831 which has been modulated through the laser modulated signal from the image signal control unit 810 in this way scans the photosensitive drum, whereby an electrostatic latent image is formed on the photosensitive drum, the electrostatic latent image is developed into a toner image by the developer unit, and the toner image is transferred onto a sheet by the transfer unit to thereby output the image on the sheet.

Figure 16:
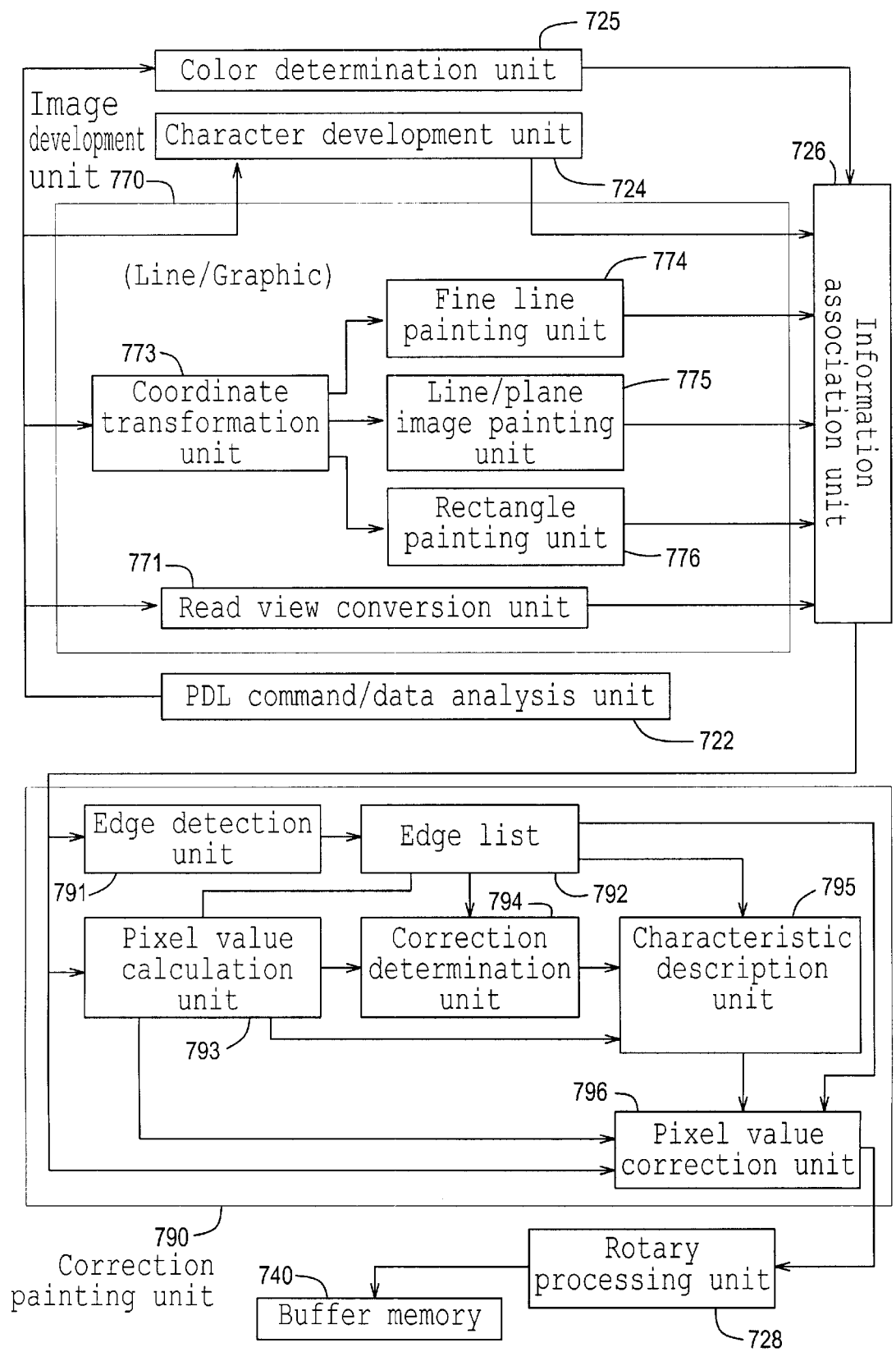
FIG. 16 is a view showing an example of principal part of a main control unit in the image processing unit of FIG. 14.
Figure 17A:
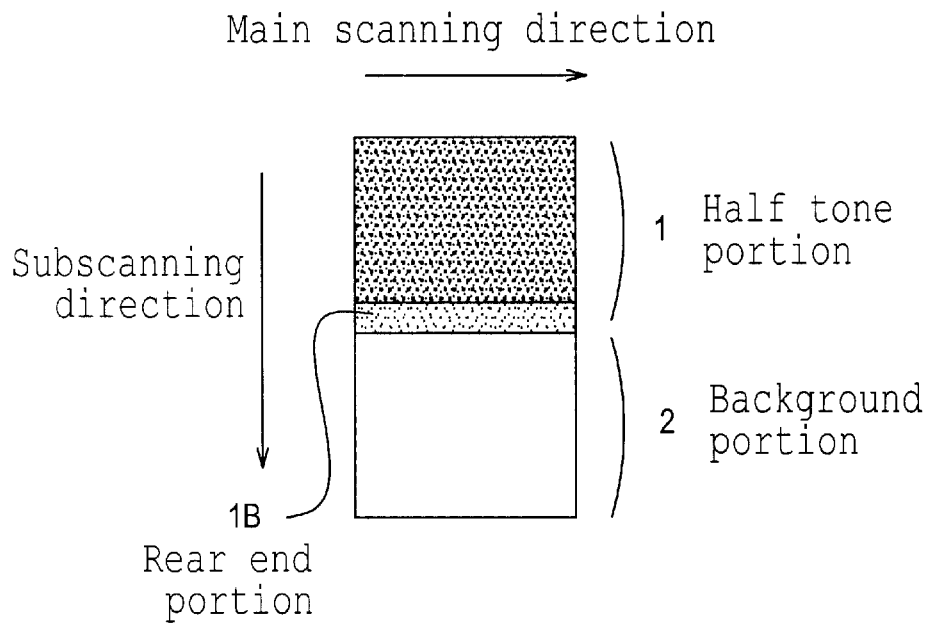
FIGS. 17(A) and 17(B) is a view showing an embodiment of lowered density at a half tone portion and lowered density at a low density portion.
Figure 17B:
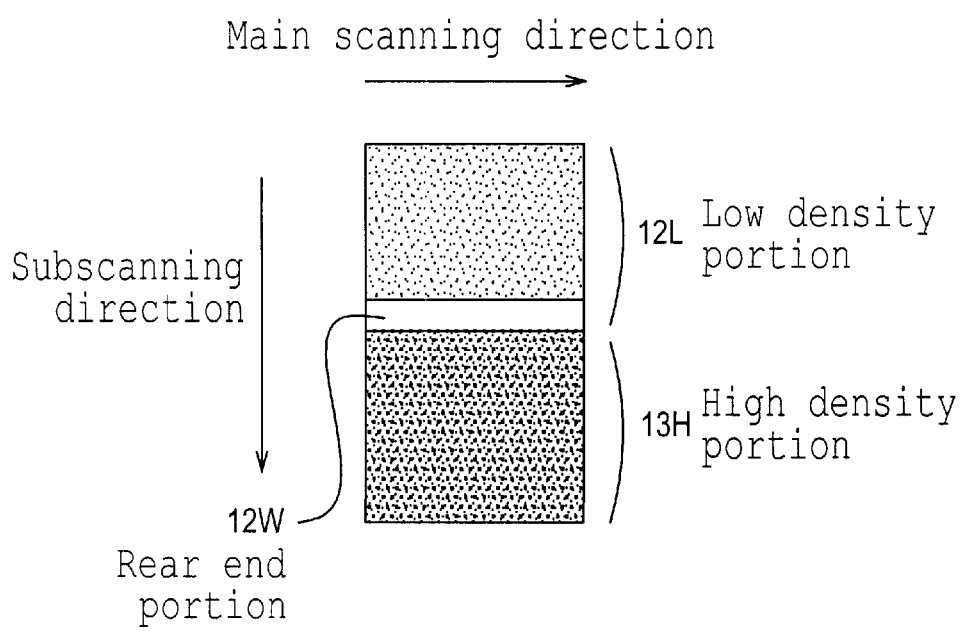

FIG. 16 shows the concrete structure of essential parts of the image development unit 770, the correction painting unit 790, and the like in the main control unit 720. The image development unit 770 develops the code data from the PDL command/data analysis unit 722 into image data for each of three image objects of characters, lines/graphic forms, and read image for painting. At this time, the command to rotate the image by 270 degrees in a clockwise direction is given as described above.

The character information is transmitted to the character development unit 724 to be font developed, whereby bit map data for characters are produced, and passed to the information association unit 726. The read image information is passed to the information association unit 726 after an image conversion process such as resolution conversion is performed thereon at the read image conversion unit 771.

The line/graphic information is coordinate transformed by a coordinate transformation unit 773 to be painted as images described in PDL for each of the fine lines, line/plane images and rectangles. More specifically, a fine line portion is painted by a fine line painting unit 774 to be passed to the information association unit 726, a portion of line/plane image is painted by a line/plane image painting unit 775 to be passed to the information association unit 726, and a rectangular portion is painted by a rectangle painting unit 776 to be passed to the information association unit 726.

The information association unit 726 lays images for each image object one on top of another to constitute a pictorial image for one line, and performs processes such as color conversion for each object on the basis of information obtained from the color determination unit 725. Thus, the image data from the information association unit 726 are supplied to the correction painting unit 790 for each color to correct their pixel values.

The correction painting unit 790 is, in this example, constructed of an edge detection unit 791, an edge list 792, a pixel value calculation unit 793, a correction determination unit 794, a characteristic description unit 795, and a pixel value correction unit 796 in the quite same manner as the image correction unit 250 shown in FIG. 4 of the first embodiment. The structure and operation of each unit are quite the same as those of each unit of the image correction unit 250 shown in FIG. 4 of the first embodiment, and therefore, from the correction painting unit 790, there can be obtained image data whose pixel value has been corrected so as to supplement the amount of lowered density due to the image output characteristic of the image output unit 800 in the subscanning direction.

The image data from the correction painting unit 790 after the correction are compressed in a rotationally processable form, and are rotationally processed at the rotary processing unit 728 so that their time series direction becomes a direction corresponding to the main scanning direction of the image output unit 800 to be written in the buffer memory 740 as output image data.

In an image forming apparatus of the aforesaid example, that is, the printing equipment 600, when the aforesaid correction of pixel value is performed at the correction painting unit 790 in the image processing unit 700 and such a patch as described above was outputted as the half tone portion 1 shown in FIG. 11(A) and the low density portion 12L and the high density portion 13H shown in FIG. 12(A), decrease in the density did not occur in the half tone portion 1 and the low density portion 12L.

In this respect, also in this example, the structure of each portion of the correction painting unit 790 shown in FIG. 16 can be changed as described above in the same manner as each unit of the image correction unit 250 of the first embodiment shown in FIG. 4.

Also, the aforesaid example shows a case where each function of the correction painting unit 790 is realized using software, and the correction painting unit 790 may be constructed of hardware having the equivalent function for speeding up.

Figure 22:
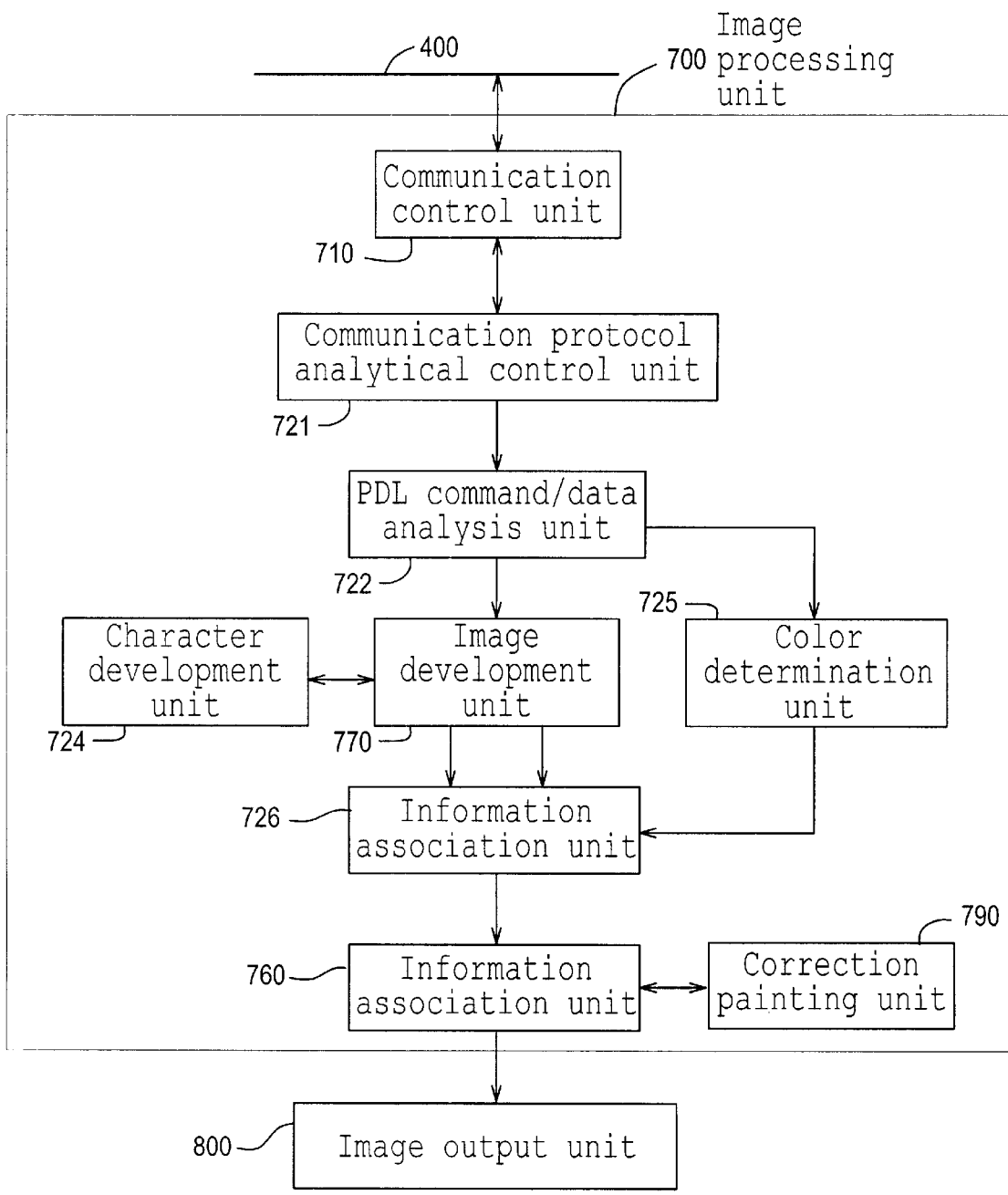
FIG. 22 is a view showing an example of a conceivable image processing device.

As described above referring to FIG. 22, it is conceivable in a network printer that in the image development unit 770 in the image processing unit 700, image data are developed as a data row in the main scanning direction, the image data thus developed are written in the page memory 760, and thereafter, the correction painting unit 780 reads out the image data in the subscanning direction from the page memory 760 to correct the pixel values of the image data.

In this case, however, the image data are corrected after the image data for one page are written in the page memory 760, and therefore, the data cannot be corrected on a real-time basis.

And yet, if an attempt is made to write image data compressed in the page memory 760, all image data compressed in the main scanning direction will have to be analyzed in order to read out the image data in the subscanning direction from the page memory 760 for correction at the correction painting unit 780, resulting in a complicated process. To that end, if image data in a non-compressed form is written in the page memory 760, a page memory having a large capacity will be required as the page memory 760.

In contrast, in the aforesaid second embodiment, by the rotation command being given to the PDL command/data, the image data is developed as a data row in the subscanning direction at the image development unit 770, and the image data of the data row in the subscanning direction is corrected by the correction painting unit 790. Therefore, the image data can be corrected at high speed on a small processing scale and yet on a real-time basis. Thus, since the image data is corrected before it is written in the buffer memory 740 constituting the page memory, the capacity of the buffer memory 740 can be reduced by the compression of the image data without affecting the corrected image data even if the image data is compressed at the rotary processing unit 728 after the correction.

Also, according to the second embodiment, since the pixel value of the image data is corrected so as to supplement the amount of lowered density as in the first embodiment, it becomes possible to avoid a large size and a high cost of the image output unit 800 while achieving higher resolution of the output image by an increase in the number of screen lines as in the case where decrease in the density is prevented by improving the accuracy of the laser light scanner, which is the means for writing an electrostatic latent image, to enhance the contrast of the development field.

Further, the second embodiment has the advantage that it is possible to securely prevent decrease in the density of graphic images especially produced by the client apparatus, which easily cause decrease in the density.

According to the present invention, it is possible to prevent decrease in the density due to the image output characteristic of the image output unit in the subscanning direction by means of a method capable of real-time processing, and avoiding a large size and a high cost of the image output unit while achieving higher resolution of the output image due to an increase in the number of screen lines, without causing the circuit capacity and the memory to be increased.

What is claimed is:

1. An image processing device for processing image data to send it to an image output device for outputting the image onto a recording medium through said image data, comprising:

image input means for acquiring input image data so that its time series direction becomes a direction corresponding to a subscanning direction orthogonal to a main scanning direction, which is a direction in which pixels are temporally continuously formed on said recording medium of said image output device; p1 correction means for correcting the input image data from said image input means in accordance with a non-linear and asymmetric image output characteristic indicating a difference in characteristic between image portions in said subscanning direction; and rotary processing means for rotationally processing the image data from said image correction means after the correction so that its time series direction becomes a direction corresponding to said main scanning direction of said image output device, and for sending the image data after the rotary processing to said image output device.

2. An image processing device as defined in claim 1, wherein with said image input means as a scanner, the main scanning direction, which is a read line direction of the scanner, is set to a direction corresponding to said subscanning direction of said image output device.

3. An image processing device as defined in claim 1, wherein said image input means is provided with image acquisition means for acquiring image information described in page description language through communication means, analysis means for analyzing the image information, and image development means for developing the image data according to the analysis result, and by a command to collectively rotate the image being given to said image information, it is possible to output, from said image development means, the input image data whose time series direction is set to a direction corresponding to said subscanning direction of said image output device.

4. An image processing device as defined in claim 1, wherein said image correction means comprises:
   edge detection means for detecting the position and direction of an image edge from said input image data;
   pixel value detection means for detecting the pixel values of images before and after the image edge detected by said edge detection means;
   correction determination means for determining whether or not correction of the image data is required and the form from the direction of the image edge detected by said edge detection means, and the pixel value detected by said pixel value detection means; and
   correction execution means for correcting said input image data on the basis of the determination result by said correction determination means.

5. An image processing device as defined in claim 4, wherein when the pixel value of said input image data varies by 10% or more at gradation stage, said edge detection means determines it to be an image edge.

6. An image processing device as defined in claim 4, wherein as the pixel value of the image after the image edge, said pixel value detection means calculates an average value for pixel values for each pixel within a period of a specified number of pixels from the image edge or within a period from the image edge to the next image edge in the reverse direction, whichever is shorter.

7. An image processing device as defined in claim 4, wherein said correction execution means has characteristic description means for holding a number of pixels for correction object and an amount of corrected pixel value, and pixel value correction means for correcting the pixel value of said input image data in accordance with the number of pixels for correction object and the amount of corrected pixel value from said characteristic description means.

8. An image processing device as defined in claim 1, wherein the difference in characteristic between the image portions is a difference in density.

9. An image processing device as defined in claim 1, wherein the difference in characteristic between the image portions is a difference in tone.

10. An image forming apparatus, comprising:
    image output means for outputting an image on a recording medium through image data;
    image input means for acquiring input image data so that its time series direction becomes a direction corresponding to a subscanning direction orthogonal to a main scanning direction, which is a direction in which pixels are temporally continuously formed on said recording medium of said image output means;
    image correction means for correcting the input image data from said image input means in accordance with a non-linear and asymmetric image output characteristic indicating a difference in characteristic between image portions in said subscanning direction; and
    rotary processing means for rotationally processing the image data from said image correction means after the correction so that its time series direction becomes a direction corresponding to said main scanning direction of said image output means, and for sending the image data after the rotary processing to said image output means.

11. An image forming apparatus as defined in claim 10, wherein with said image input means as a scanner, the main scanning direction, which is a read line direction of the scanner, is set to a direction corresponding to said subscanning direction of said image output means.

12. An image forming apparatus as defined in claim 10, wherein said image input means is provided with image acquisition means for acquiring image information described in page description language through communication means, analysis means for analyzing the image information, and image development means for developing the image data according to the analysis result, and by a command to collectively rotate the image being given to said image information, it is possible to output, from said image development means, the input image data whose time series direction is set to a direction corresponding to said subscanning direction of said image output means.

13. An image forming apparatus as defined in claim 10, wherein said image correction means comprises:
    edge detection means for detecting the position and direction of an image edge from said input image data;
    pixel value detection means for detecting the pixel values of images before and after the image edge detected by said edge detection means;
    correction determination means for determining whether or not correction of the image data is required and the form from the direction of the image edge detected by said edge detection means, and the pixel value detected by said pixel value detection means; and
    correction execution means for correcting said input image data on the basis of the determination result by said correction determination means.

14. An image forming apparatus as defined in claim 13, wherein when the pixel value of said input image data varies by 10% or more at gradation stage, said edge detection means determines it to be image edge.

15. An image forming apparatus as defined in claim 13, wherein as the pixel value of the image after the image edge, said pixel value detection means calculates an average value for pixel values for each pixel within a period of a specified number of pixels from the image edge or within a period from the image edge to the next image edge in the reverse direction, whichever is shorter.

16. An image forming apparatus as defined in claim 13, wherein said correction execution means has characteristic description means for holding a number of pixels for correction object and an amount of corrected pixel value, and pixel value correction means for correcting the pixel value of said input image data in accordance with the number of pixels for correction object and the amount of corrected pixel value from said characteristic description means.

17. An image forming apparatus as defined in claim 10, wherein the difference in characteristic between the image portions is a difference in density.

18. An image forming apparatus as defined in claim 10, wherein the difference in characteristic between the image portions is a difference in tone.

* * * * *